US007689557B2

(12) United States Patent
Pandit et al.

(10) Patent No.: US 7,689,557 B2
(45) Date of Patent: Mar. 30, 2010

(54) SYSTEM AND METHOD OF TEXTUAL INFORMATION ANALYTICS

(76) Inventors: Madan Pandit, 2809, 19th Main, HAL $2^{nd}$ Stage, Indiranagar, Bangalore, Karnataka (IN) 560008; Vaibhav Bhatia, 747, $10^{th}$ Main, $8^{th}$ Cross Indiranagar $2^{nd}$ Stage, Bangalore, Karnataka (IN) 560008; Sanjay Deshmukh, 4, Jay Yogeshwar Co-operative Housing Society, Charwak Chauk, Indira Nagar, Nasik, Maharashtra (IN) 422005

( * ) Notice: Subject to any disclaimer, the term of this patent is extended or adjusted under 35 U.S.C. 154(b) by 882 days.

(21) Appl. No.: 11/183,657

(22) Filed: Jul. 18, 2005

(65) Prior Publication Data
US 2006/0277465 A1    Dec. 7, 2006

(30) Foreign Application Priority Data
Jun. 7, 2005    (IN)    ............... 695/CHE/2005

(51) Int. Cl.
*G06F 17/30* (2006.01)
*G06F 17/00* (2006.01)
(52) U.S. Cl. .................... 707/6; 715/209; 707/101
(58) Field of Classification Search .............. None
See application file for complete search history.

(56) References Cited

U.S. PATENT DOCUMENTS

| | | | | |
|---|---|---|---|---|
| 5,634,084 | A * | 5/1997 | Malsheen et al. | 704/260 |
| 5,819,260 | A | 10/1998 | Lu | 707/3 |
| 5,983,170 | A * | 11/1999 | Goodman | 704/9 |
| 6,052,693 | A * | 4/2000 | Smith et al. | 707/104.1 |
| 6,539,376 | B1 | 3/2003 | Sundaresan | 707/5 |
| 6,651,218 | B1 * | 11/2003 | Adler et al. | 715/209 |
| 7,039,579 | B2 * | 5/2006 | Epstein et al. | 704/9 |
| 7,194,483 | B1 * | 3/2007 | Mohan et al. | 707/104.1 |
| 7,234,942 | B2 * | 6/2007 | Hu et al. | 434/178 |
| 2004/0117734 | A1 | 6/2004 | Krickhahn | 715/513 |
| 2004/0167771 | A1 * | 8/2004 | Duan et al. | 704/10 |
| 2004/0230571 | A1 * | 11/2004 | Robertson | 707/3 |
| 2005/0108256 | A1 * | 5/2005 | Wakefield et al. | 707/100 |

(Continued)

FOREIGN PATENT DOCUMENTS

EP    1283476 A1    2/2003

OTHER PUBLICATIONS

Brin "Extracting Patterns and Relations from the World Wide Web". Computer Science Department, Stanford University.*

(Continued)

*Primary Examiner*—Pierre M Vital
*Assistant Examiner*—Berhanu Mitiku
(74) *Attorney, Agent, or Firm*—Ash Tankha

(57) ABSTRACT

This invention provides a method and system for analyzing and deriving analytical insights from textual information. The information structuration process determines the structure in which the text information is rendered. A cyclical extraction process using the parameters of co-frequency, co-dependency, and co-relatedness and parts of speech, determines various textual aspects and their subcomponents such as themes and dimensions. Using the subcomponents of the textual aspects, relationship maps are built, disambiguated and ranked. A text analytics and decision support matrix is created using the ranked relations, thereby providing a highly relevant result set to the user's information need. A multidimensional navigation matrix is created that helps a user navigate across dimensions.

19 Claims, 20 Drawing Sheets

U.S. PATENT DOCUMENTS

| | | | |
|---|---|---|---|
| 2005/0154690 A1* | 7/2005 | Nitta et al. | 706/46 |
| 2005/0165600 A1* | 7/2005 | Kasravi et al. | 704/9 |
| 2006/0074833 A1* | 4/2006 | Gardner et al. | 706/45 |
| 2006/0112110 A1* | 5/2006 | Maymir-Ducharme et al. | 707/100 |
| 2006/0136400 A1* | 6/2006 | Marr | 707/3 |
| 2007/0214137 A1* | 9/2007 | Gloor | 707/6 |

OTHER PUBLICATIONS

Coates-Stephens "The Analysis and Acquisition of Proper Names for the Understanding of Free Text" Computers and the Humanities 26: 441-456, 1993. KluwerAcademic Publishers. Printed in the Netherlands.*

Liddy et al. "DR-Link System: Phase I Summary", Syracuse University 4-206 Center for Science & Technology, Syracuse, New York 13244-4100.*

Liddy et al. "Text Categorization for Multiple Users Based on Semantic Features from a Machine-Readable Dictionary", ACM Transactions on Information Systems, vol. 12, No. 3, Jul. 1994, pp. 278-295.*

* cited by examiner

Selected Themes for Debu Panda

Java performance tuning,Performance tuning in Java,Java performance,Java tuning,Memory leaks,Memory Problems,memory error,oracle java slow,Oracle and Java,JVM hanging,JVM problems,JVM error,JVM crashes,bytecode instrumentation,bytecode,bytecode engineering library,java ☑ Added to the Report

REFERENCE TEXT EXCERPTS

Reference Text Excerpts - Career Summary of Debu Panda

Debu Panda is a principal product Manager of the Oracle Application Server development team, where he focuses his efforts on the EJB container and Transaction Manager. He has more than 13 years of experience in the IT industry and has published articles in several magazines and has presented at many conferences. His J2EE-focused weblog can be found at http://radio.weblogs.com/0135826/.

[△ Go Back]

In this interview, Debu Panda, the principal product manager for Oracle's J2EE server talks about the various Oracle products for J2EE. He discusses the challenges before J2EE and also shares his views on the ongoing JDO and EJB 3.0 persistence controversy.

[△ Go Back]

Reference Text Excerpts - Organization(s) Associated with Debu Panda

Inside Scoop on J2EE : Tips and tricks on J2EE and Oracle Application Server by Debu Panda Updated: 2/17/2005; 4:55:58 AM.

[△ Go Back]

From ONJava.com : Oracle's Debu Panda introduces SOA and examines the technologies available in the Java space to build service-oriented application.

[△ Go Back]

FIGURE 18B

SYSTEM AND METHOD OF TEXTUAL INFORMATION ANALYTICS

BACKGROUND OF THE INVENTION

The present invention generally relates to textual information analysis and analytics.

Semantic analysis techniques and statistical analysis techniques are used in computer implemented natural language processing solutions. The exclusive application of either a semantic technique or a statistical technique to identify the context of textual information does not provide satisfactory results. Hybrid techniques are a combination of semantic and statistical techniques. Hybrid techniques have also been applied for textual information processing. In the hybrid techniques, forms of ontological meaning creation and statistical approaches are fused to process text.

In semantic techniques, an ontology driven representation of meaning acts as the unified meaning universe to classify information in documents, thereby enabling effective information storage and retrieval. However, given the dynamic and infinite generative nature of text, any external ontology only serves a limited purpose.

Statistical techniques process numerical data to process text. Typically, statistical techniques treat text as statistical units but the context of the text is not always interpretable by statistical techniques.

There is a market need for a context interpreting hybrid technique that performs the following functions: determines the structure of information, classifies information structure types such as products information, news etc.; subdivides textual information into structured and unstructured elements; maps and mines structured and unstructured elements; determines the relationship between the structured and unstructured elements; conducts cyclical processing, conducts statistical, linguistic and non-linguistic analysis for disambiguation between relationships. This technique places emphasis on granular classification of information structure types rather than completely imposing ontologies or taxonomies from outside the context of the text.

Textual information has an inherent structure that allows for communication to happen across time, space and context. There are some aspects of text that allow for easy transmission of information to the reader, whereas other aspects of text are difficult to communicate.

This invention is based on the premise that textual information is not entirely unstructured, and that the textual information can be divided into structured textual aspects and unstructured textual aspects. This invention applies cyclical processing of part of speech tagger, dimension extraction, co-frequency, co-dependency, and co-relatedness; captures the context of the information creator and the context of the database of textual information by mapping and mining the structured aspects in relation to unstructured aspects. This invention uses structured information aspects to understand more complex unstructured aspects of textual information. For example, the theme "retail industry" could be better understood based on more structured aspects such as the names of the companies involved in the "retail industry", or could be better understood in relation with other themes such as "private labels".

The mapping and mining of the structured textual aspects, such as the names of people, organization, brands and products in relationship with and in contrast to unstructured textual aspects enables very human like processing of textual information. This mapping and mining method identifies known and unknown relationships, and allows the user to navigate and search through this information with greater precision.

SUMMARY OF THE INVENTION

This invention provides a method and system for analysing and deriving analytical insights from textual information. Information structuration is performed, i.e. the information presentation structure is determined and the textual information in the document corpus is then classified into one or more information structure types, followed by dense text extraction and non-dense text extraction. A cyclical extraction process using the parameters of co-frequency, co-dependency, and co-relatedness and parts of speech, determines various textual aspects and their subcomponents such as themes and dimensions. Using the subcomponents of the textual aspects, relationship maps are built, disambiguated and ranked. A text analytics and decision support matrix is created using the ranked relations, thereby providing a highly relevant result set to the user's information need. A multidimensional navigation matrix is created that helps a user navigate across dimensions.

BRIEF DESCRIPTION OF DRAWINGS

FIG. 17A, FIG. 17B, FIG. 17C and FIG. 17D illustrates another embodiment of TAP, a tool for researchers to create profiles of information pieces.

FIG. 18A, FIG. 18B and FIG. 18C, illustrate another embodiment of TAP, a tool used for profiling a person.

DETAILED DESCRIPTION OF THE INVENTION

Definitions of terms have been provided at the end of the detailed description section.

Figure 1:
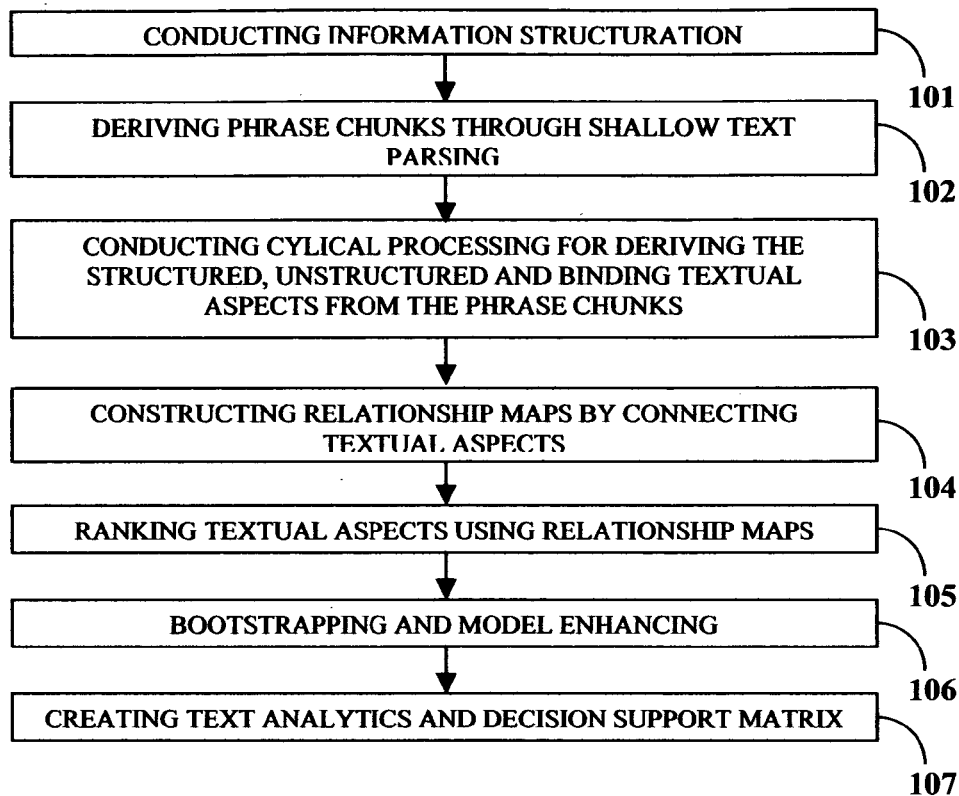
FIG. 1 illustrates the processes implemented by the textual information processing platform (TAP).

FIG. 1 describes the overall method of analysing and deriving analytical insights of textual information from a given document corpus. Information structuration is performed, i.e. the information presentation structure is determined and the textual information in the document corpus is classified into one or more information structure types, followed by dense text extraction and non-dense text extraction 101. The dense text is processed in relation with non-dense text. The description and classification of structural information types is described in the specification under FIG. 3. Phrase chunks are derived by shallow text parsing 102. The process of shallow text parsing comprises parts of speech tagging and the application of information structures. The phrase chunks are refined through cyclical processing to yield structured, unstructured and binding textual aspects 103. The method of using cyclical processing to determine structured, unstructured and binding textual aspects is explained further under the discussion of FIG. 5. The structured, unstructured and binding textual aspects form themes, actions, dimensions and qualifiers, this process is explained in detail under the description of FIG. 5. Relationship maps and relational indices 104 are constructed by identifying the relation between the segments of themes, actions, dimensions and qualifiers. This process of relationship building will be explained further in the description under FIG. 10. The textual aspects are disambiguated. The process of disambiguation process is explained further under the description of FIG. 11. The textual aspects are ranked using relationship maps 105 and the most relevant textual aspects are identified. This ranking process will be explained further in the description under FIG. 12. A text analytics and decision support matrix 106 is created using the most relevant textual aspects.

Figure 2:
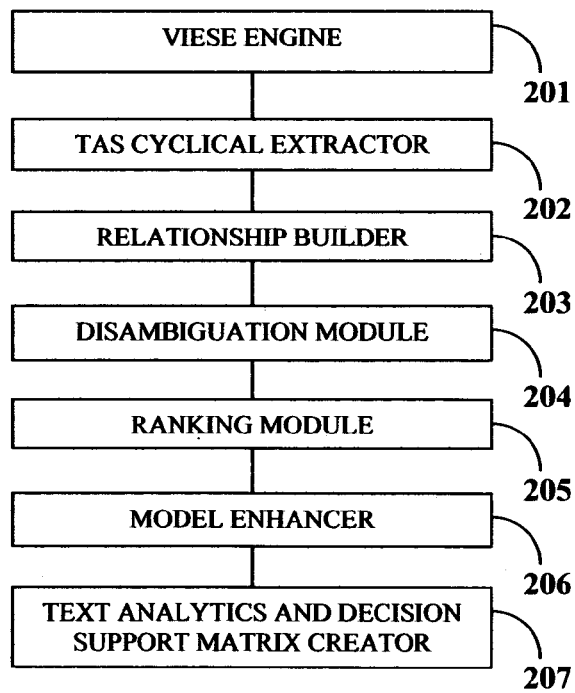
FIG. 2 illustrates the architecture of TAP.

FIG. 2 describes the architecture of the textual information processing platform hereafter referred to as the TAP platform that implements the method of textual information processing illustrated in FIG. 1. The TAP platform is generic, broad level and domain neutral. The TAP platform contains various modules. Each module delivers its unique result that can be used individually or in conjunction with the processes implemented by other modules. The products and applications built around the TAP platform enable users to manage their information needs efficiently, whereby the user saves time and money in not having to review redundant information. Users can select various levels of automations based on their specific needs and can customize the output by incorporating their own decision support matrix variables. For example, a student researcher studying development of democracy in the Middle East may desire information based on the dimension definition as "location", "person" and "political role". Whereas, an equity analyst working on the automobile sector may desire information based on the dimension definition as "output of auto versus steel industry", and "investment in auto retail". Hence, the student researcher's matrix will have its weights based on locations, roles and persons. The equity analyst's matrix will have its weights based on auto production, steel production and investment in retail.

The TAP platform empowers users to process information efficiently, enabling information creation, storage, transmission, searching, retrieval, navigation, compilation, processing, analysis, implementation for information analytics for decision support, acceptance or rejection criterion and use. The TAP platform comprises the visual information structuration and extraction (VIESE) engine 201, TAS cyclical extractor 202, relationship builder 203, disambiguation module 204, ranking module 205, model enhancer 206 and text analytics and decision support matrix creator 207. VIESE 201 extracts dense and non-dense text type information. The VIESE outputs its information into the cyclical extractor 202. The TAS cyclical extractor 202 extracts phrase chunks. The phrase chunks are one of the following: structured, unstructured and binding textual aspects. The relationship builder 203 builds relations between the segments of themes, actions, dimensions and qualifiers. The disambiguation module 204 disambiguates the relations between the themes, actions, dimensions and qualifiers. The ranking module 205 ranks the textual aspects. The model enhancer 206 generates automated web queries and conducts a deeper and wider web crawl. The text analytics and decision support matrix creator 207 creates customisable text information processing solutions for the user.

Figure 3:
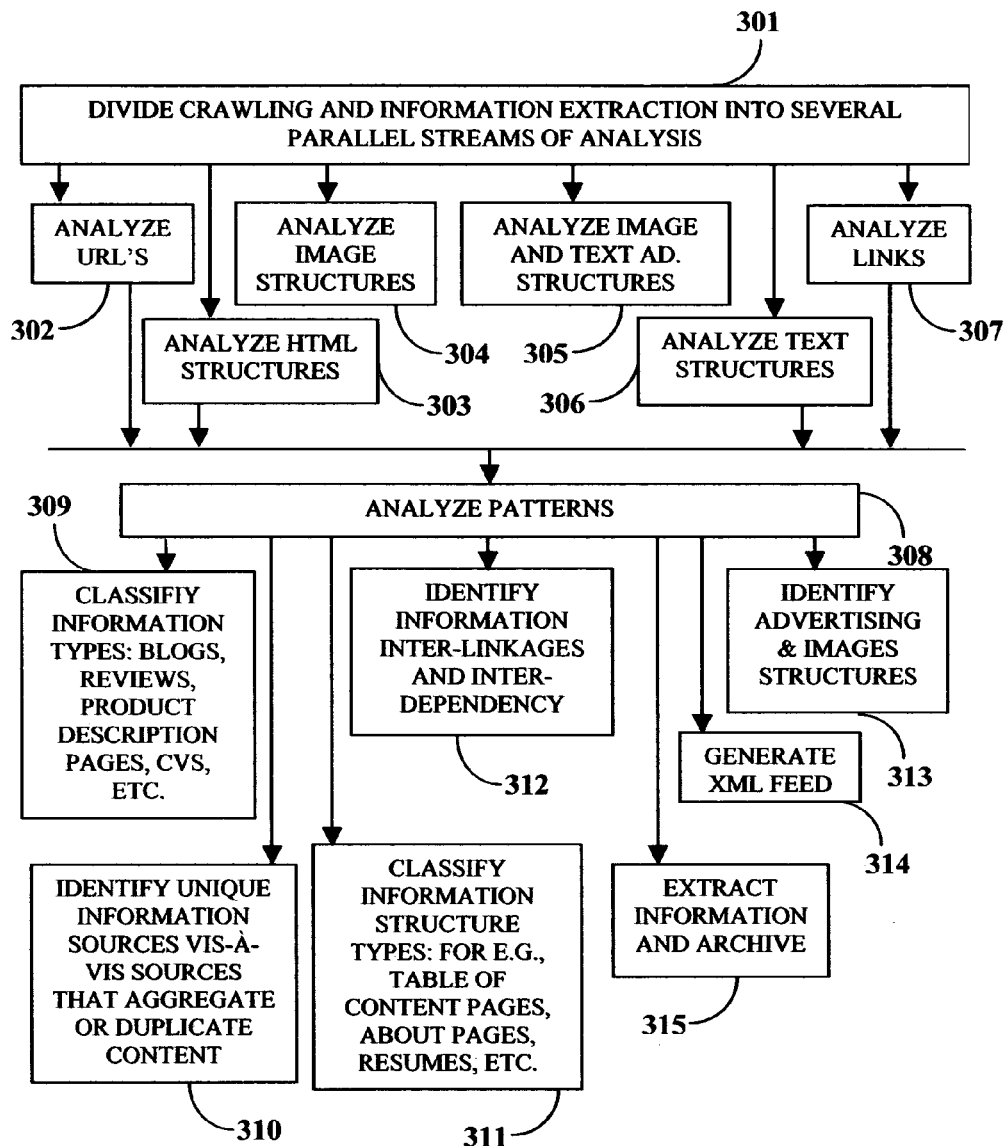
FIG. 3 illustrates the processes implemented by the visual information structuration and extraction (VIESE) engine.

FIG. 3 illustrates the processes implemented by the visual information extraction structuration engine (VIESE) 201. In order to extract and index text that is relevant and useful during information processing and analysis, it is necessary to determine the inter-dependence of textual information pieces. This determination of inter dependencies in turn requires a strong understanding of the inherent structure of the information source, including how the creator of the information, structures the information on a web page or in an internal document such as Microsoft Word™ of Microsoft Inc. or Acrobat PDF™ document of Adobe Systems Inc.

VIESE 201 classifies information sources into one or more information structure types. Examples of information types include news, blogs, product reviews, product description pages, resumes, etc. The manner in which information is created bears a unique stamp that distinguishes one information type from another. For example, a news article is far more structured than a blog; and, an expert product review is similar to a product specification than a consumer review. Also, for example, in a news article, the first paragraph is typically a summary of the entire body of the news article. Blogs typically do not have a summary in the beginning due to the informal nature of the creation of blogs. Product specifications are less descriptive than a product description.

VIESE 201 divides crawling and information extraction into several parallel streams of analysis 301. The information type analysis elements of VIESE 201 include uniform resource locators (URL) analysis 302, image structure analysis 304, link analysis 307, hyper text markup language (HTML) structure analysis 303, image and text advertisement structure analysis 305 and text structure analysis 306.

VIESE 201 automates crawling and information extraction. For example, consider the case of an information source containing e-mails and resumes. An email has a typical structure. For example it contains the following headers: "From", "To", "Date", "Subject" and body fields. A resume also has a generic structure including applicant's name, qualifications, work experience, etc. In this example of information source containing e-mails and resumes, the VIESE engine 201 crawls the information source and classifies the information into e-mails and resumes.

The VIESE engine 201 builds upon and increases its intelligence over time. For example, consider the case of an information source that has been classified as an email after the VIESE engine 201 crawls the information source and the human user of VIESE 201 for the first time classifies this information type as an "email". The pattern of the information, i.e., the inherent structure of the information source is identified for the first time through human input and VIESE 201 classifies this particular structure as an e-mail. When VIESE 201 crawls another information source, the next e-mail that has a pattern or structure that is a variant of the first e-mail encountered by VIESE 201, VIESE 201 will store the structure of the variant e-mail for use in future information processing and thereby progressively builds its intelligence.

VIESE 201 analyzes the patterns 308 in the information structure types and accomplishes the following information structuration activities:
  a. Classifies information structure types 309, for example, news, blogs, reviews, product description pages, resumes, etc.
  b. Identifies information inter-linkages and inter-dependency between dense and non-dense types 312.
  c. Identifies unique information sources vis-a-vis sources that aggregate or duplicate information 310. This identification process overcomes the problem of information cloaking.
  d. Identifies advertising and image structures 313.
  e. Segregates information structure types 311, for example, table of content pages, about pages, resumes, etc.
  f. Generates XML feed 314.
  g. Extracts information and intelligently archives the information within the textual information database (TID) 315.

Examples of information structure types are news, reports, letters, e-mail, blog, forum, product specifications, reviews, advertisements applications and forms, etc. Each information structure type is distinct from the other. For example, the "news" information structure type is more structured, formal and follows a pattern, such as "subject title, head line, author, date, dense text, news agency name". Whereas, the format of an e-mail contains text, with a pattern such as "date . . . , from . . . , to . . . , cc . . . ,bcc . . . , subject . . . , attachment . . . ,". Similarly product specifications provided by a manufacturer are more structured than a product review written by a professional. As another example, a product review issued by a professional is far more structured and follows specific steps compared to a product review written by a consumer.

Once the information type of the information is determined, VIESE 201 divides the information into a dense text type information component and a non-dense text type information component. The structural elements of "information structure types" identified by VIESE 201 includes the following:
  dense text, such as clauses, sentences and paragraphs;
  non-dense text types such as address, contact information, table of content and images;
  elements of visual information presentation as rendered on the computer screen;
  head line, sub-headline, titles, base line, presentation structure, etc. determines the order in which the "text structure" elements appear;
  URL structures with specific patterns for a particular "information structure type", for example the presence or absence of words in the URL; and,
  title structures with specific patterns for a particular "information structure type", for example the presence or absence of words in the title.

Figure 4:
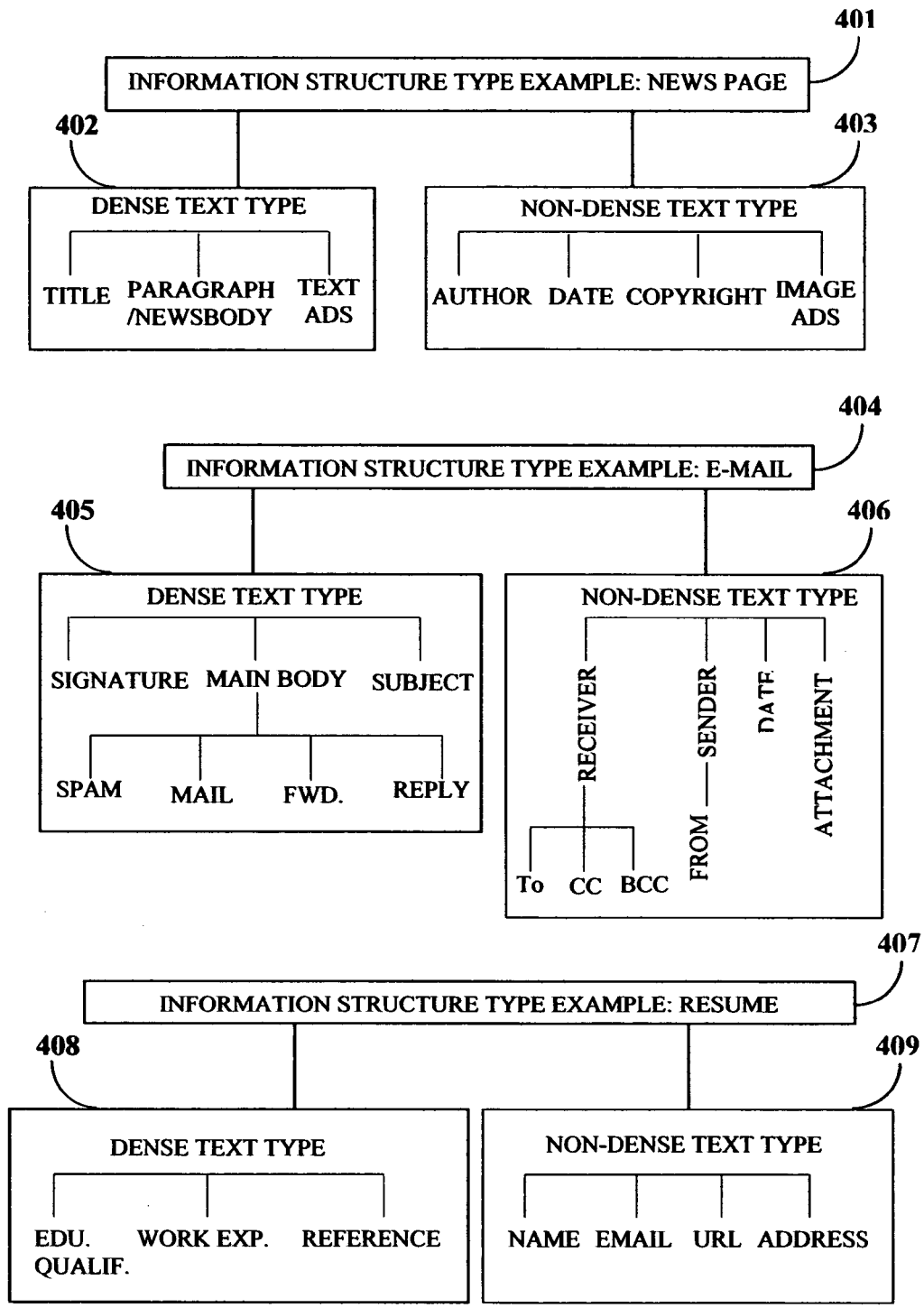
FIG. 4 illustrates examples for information structure types and their classification into dense and non-dense text types.

FIG. 4 illustrates examples of information structure types and the classification of the information structure into dense and non-dense types. In a news report 401, the non-dense portion 403 includes information such as the author's name, date, copyright notice information and image advertisements. The dense text 402 that is "rich" in information comprises the news body of the news page, the title and text based advertisements. In an email 404, the non-dense text type 406 information includes the names of the receivers (under "To", "CC" and "BCC" fields), sender (under "From" field), the date and attachment. The dense text 405 comprises the main body of the e-mail, subject and signature. The signature may include information on the name, designation, address and contact information of the sender. In a resume 407, the non-dense text type includes the name of the resume holder, e-mail, URL address and mailing address. The dense text type 408 includes the work experience, objective, educational qualifications and references. Once the non-dense type 409 information is identified in an information source, the remaining information in the information source is classified as dense type information. The dense type information is stored in the textual information database (TID).

Figure 5:
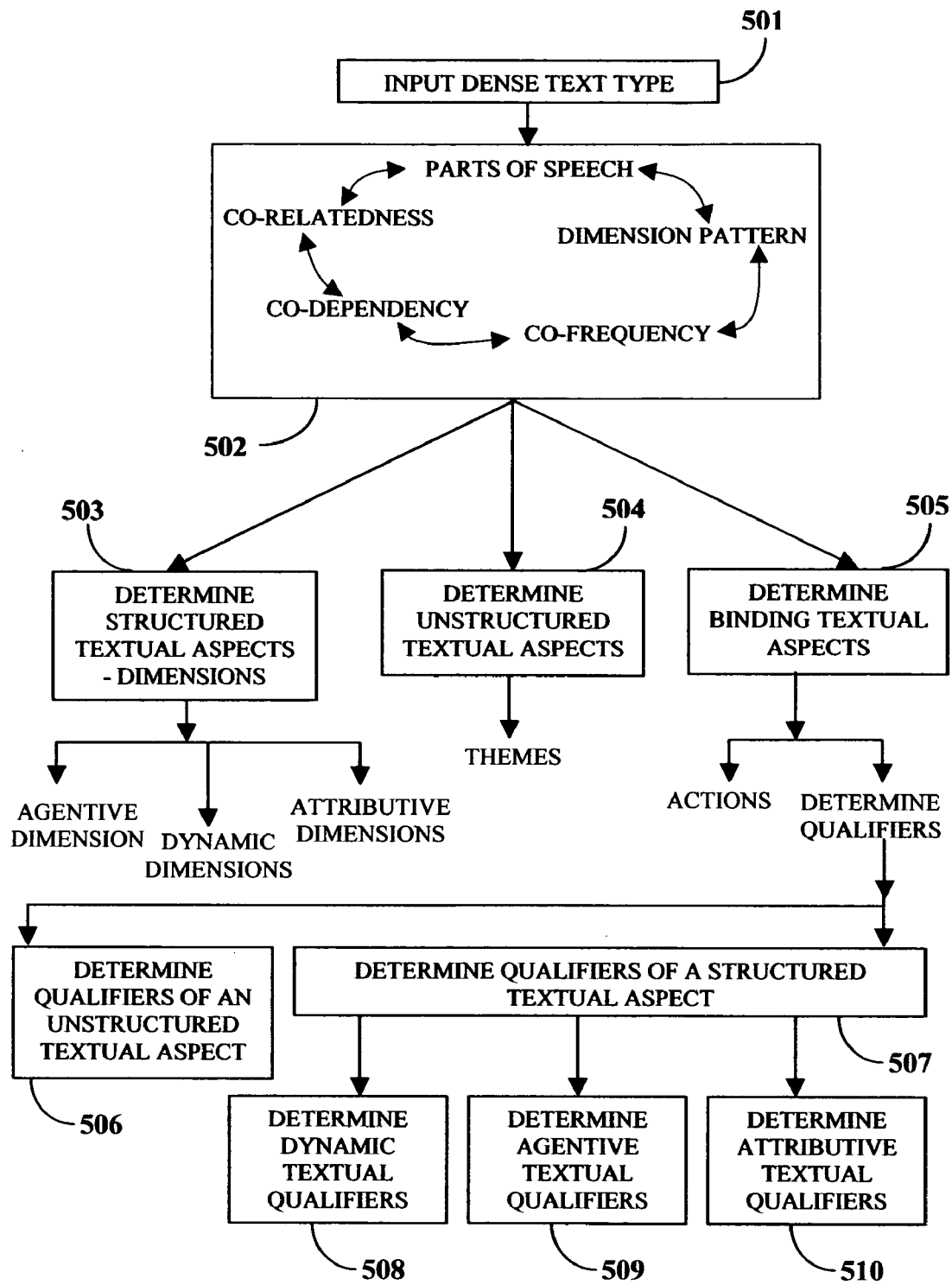
FIG. 5 illustrates the processes implemented by the cyclical extractor.

FIG. 5 illustrates the processes implemented by the cyclical extractor. The cyclical extractor 502 accomplishes cyclical processing by conducting various passes through the text. The dense text is inputted 501 from the TID. The cyclical processing 502 includes the following processing elements—part of speech tagger, dimension extraction, co-frequency, co-dependency, and co-relatedness. In the operation of the TAS cyclical operator, each processing element has the ability to take guidance from any of the other four processing elements, or can override any of the other four processing elements in the event of a conflict. For example if the part of speech tagger has determined that "About" in the sentence: "The About acquisition, the memo said, makes the Times Co. the $12^{th}$ largest entity on the Web by traffic" is a preposition, the dimension extraction has the ability and authority to provide guidance to the tagger to adjust the tag to a proper noun. Cyclical processing event is not repeated indefinitely; three to four cycles of cyclical processing typically maximizes the accuracy of the textual information extraction process. Dimension extraction is described under FIG. 7A and FIG. 7B.

The part of speech tagging process used by the cyclical extractor 502 is a subset of a basic shallow text parser. Multiple tag sets are available for use. An example of one such tagset is the tagset of The University of Pennsylvania Treebank. This part of speech tagging process enables dynamic processing of information based on the information structure type and the context of the textual information. The tag set is dynamically changed and thereby enhanced depending on the context.

Figure 6:
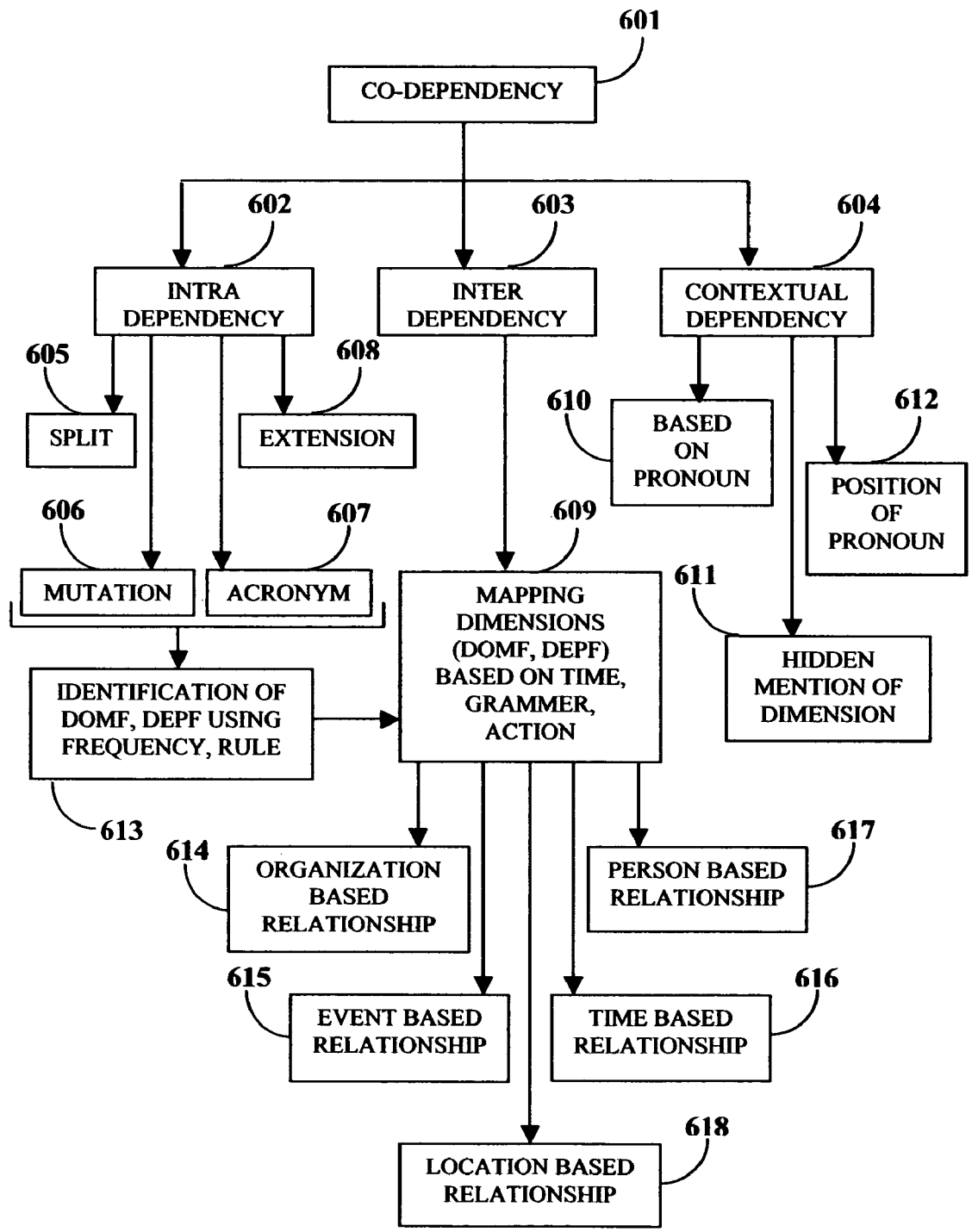
FIG. 6 illustrates textual co-dependency.

FIG. 6 illustrates co-dependency of dimensions. The measurement of co-dependency 601 includes three different substreams of processing and extraction including intra-dimensional dependency 602, inter-dimensional dependency 603 and contextual dependency 604. The dependent form has a higher frequency of occurrences compared to the dominant form. In the case of intra-dimensional dependency 603, a particular dimension can have a dominant form or a dependent form. For example, George Bush is a dominant form and George W is a dependent form. Based on the occurrence of the dimension within and across a document, a dimension could go through different forms of procedural occurrence change. The three changes in forms are effected by the processes of splitting 605, mutation 606, acronym identification 607 and extension 608. A dimension is split into a shorter form using the splitting 605 process. For example, George Bush is split as Mr. Bush. A dimension can fuse other dimensions using the mutation process 606. For example, George Bush is the person name and President Bush is a combination of a person and his role. A dimension could extend based on its procedural occurrence using the extension 608 process. For example, George Bush is the same as George W Bush.

In the case of inter-dimensional dependency 603, the dependency between two or more textual dimensions is determined and extracted. The dimensions are mapped 609, for example, the dependence within and in between dominant forms and dependent forms are determined based on time, grammar and actions. Organization 614, person 617, event 615, time 616 and location 618 based relationships are determined. A dependency may exist between a dominant form and a dependent form, dominant form and dominant form, dependent form and dependant form. For example, consider the dominant form of the organization name as Microsoft Inc. and the dependent form as Microsoft. Similarly, consider the dominant form of the organization name as Bill Gates and the dependent form as Gates. Hence the same relationship between Bill Gates and Microsoft Inc. can be formed as between Microsoft and Gates, Microsoft Inc. and Gates, Microsoft and Bill Gates.

Contextual dependency 604 is between two dimensions or within a single dimension. Contextual dependency 604 is between two different types of forms, for example between a dominant form and a dependent form. Pronouns 610, the positions of pronouns 612 and the hidden mention of dimensions 611 help establish contextual dependency. A dimension is determined by their contextual, grammatical and positional relationships.

The co-frequency of textual segments is measured for the following textual segments:
 textual segments that are frequent within a document and frequent across documents;
 textual segments that are frequent within a document but not frequent across documents;
 textual segments that are not frequent within a document but are frequent across documents; and
 textual segments that are not frequent within a document and are not frequent across documents.

Figure 7:
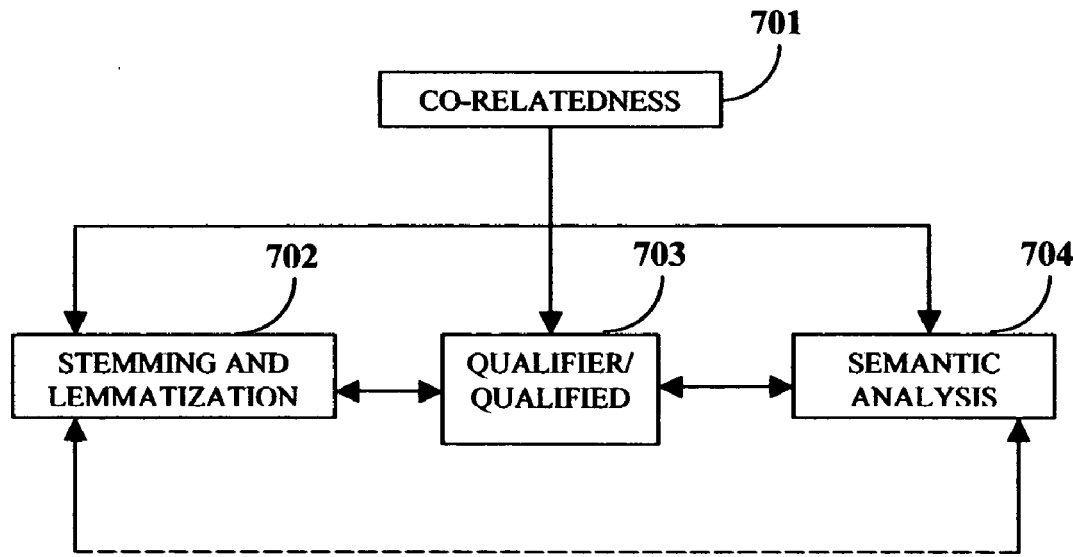
FIG. 7 illustrates co-relatedness of textual themes, textual actions and textual dimensions.

FIG. 7 illustrates co-relatedness of textual themes, textual actions and textual dimensions, textual qualifiers and qualifieds. Co-relatedness 701 is a measure of relationships to be established between various textual units. Co-relatedness 701 is a measure of the relatedness in textual themes, textual actions and textual dimensions and textual qualifiers and qualifieds. Co-relatedness 701 is measured through word-stemming and lemmatization 702, for example, the relationship between company and companies; through qualifier and qualifieds 703, for example, the relationship between mobile phone and cell phone; and through semantic analysis 704, for example, the relationship between mobile and cell.

The final output of the cyclical extractor 502 are the structured textual aspects 503, unstructured textual aspects 504 and binding textual aspects 505. Hereafter, the structured textual aspects are referred to as dimensions, the unstructured textual aspects are referred to as themes and the binding textual aspects are referred to as actions or qualifier-qualifieds.

The structured textual aspects 503 are more structured and are more context independent. Structured textual aspects 503 are also defined as textual dimensions or dimensions in other sections of this document. The structured dimensions can either be agentive dimensions, dynamic dimensions or attributive dimensions. The agentive structural aspects are causative in nature; people and organizations fall in this category. The agentive structural aspects can be involved in an action and can have qualifiers around them. For example, Mahatma Gandhi is a person name associated with peace and non-violence.

Dynamic structural aspects define physical objects and have an implicit relation with the object. These textual aspects are not predefined but are defined dynamically based on the ranking of their relations with the object. For example, zoom and flash are dynamic structural aspects for the object camera.

Attributive structural aspects define attributes of another textual aspect. These attributes can be used in a particular context either in conjunction with or when placed adjacent to another term, when they become causative or definitive in nature. For example, "General" when used to represent a role as a commissioned rank in the military organization and term "6.3" when used in case of camera as in "6.3 Mega Pixel". Other examples are location and time, which act as binding aspects.

Unstructured textual aspects 504 are the unstructured aspects of text requiring more interpretation, meaning and reader understanding of the domain under consideration. These unstructured textual aspects form textual themes.

For example, while discussing the retail industry, an author discusses "store brands" and "private labels". The "store brands" and "private labels" aspects are completely dependent on the context or perspective of the reader as well as the author and the author will most probably never be able to communicate his or her idea's exact perspective through the phrases "store brands" and "private labels". However, if the author stated "Wal-Mart", and given the fact that Wal-Mart is a publicly listed company registered with the Security Exchange Commission (SEC), the author's idea is effectively communicated.

The binding textual aspects 505 bind together either the textual aspects with each other or with textual relations. Also, the binding textual aspects, by way of binding, define the textual aspects and textual relations better, add more meaning and play a major role in the process of disambiguation. The binding textual aspects are subdivided into textual actions and textual qualification.

Textual actions provide context to assumed or intended actions, i.e., provide context to either to textual aspects or a textual relationship. Textual actions contribute towards defining the activity and dynamic state of various textual aspects or textual relations. Any textual aspect or a textual relation can have multiple textual actions associated with them or defining them. In the context of retail industry "merged", "sold" and "purchased" will be actions tags associated with "store brands" or with "Wal-Mart"

Textual qualification aspects qualify both structured and unstructured textual aspects. Textual qualification involves a process of determining a word or a series of words referred to as qualifiers that can qualify a word or a series or words referred to as qualifieds. The process of textual qualification of an unstructured textual aspect 506 is exemplified as follows. For a theme "Private Labels", "private" is the qualifier and "labels" is the qualified. The qualification of structured textual aspects 507 includes dynamic textual qualification 508 and agentive textual qualification 509. Dynamic textual qualifiers qualify a dynamic textual aspect, for example, a good optical zoom. Agentive textual qualifiers qualify an agentive textual aspect, for example, incorrigible Narendra Modi. Attributive textual qualifiers 510 qualify an attributive textual aspect, for example, the cunning Captain Hook.

Figure 8:
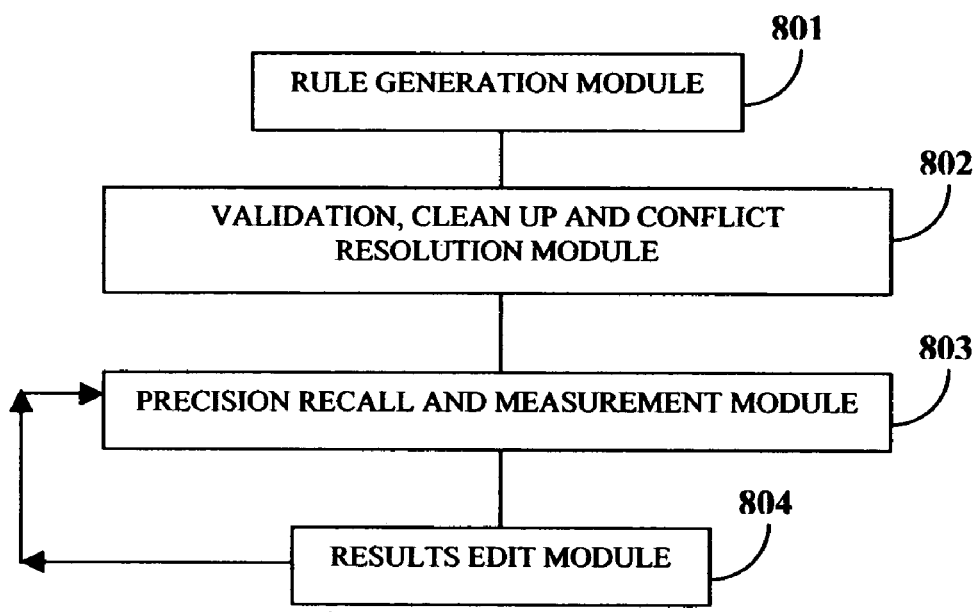
FIG. 8 illustrates the architecture of the dimension extraction engine.
Figure 9A:
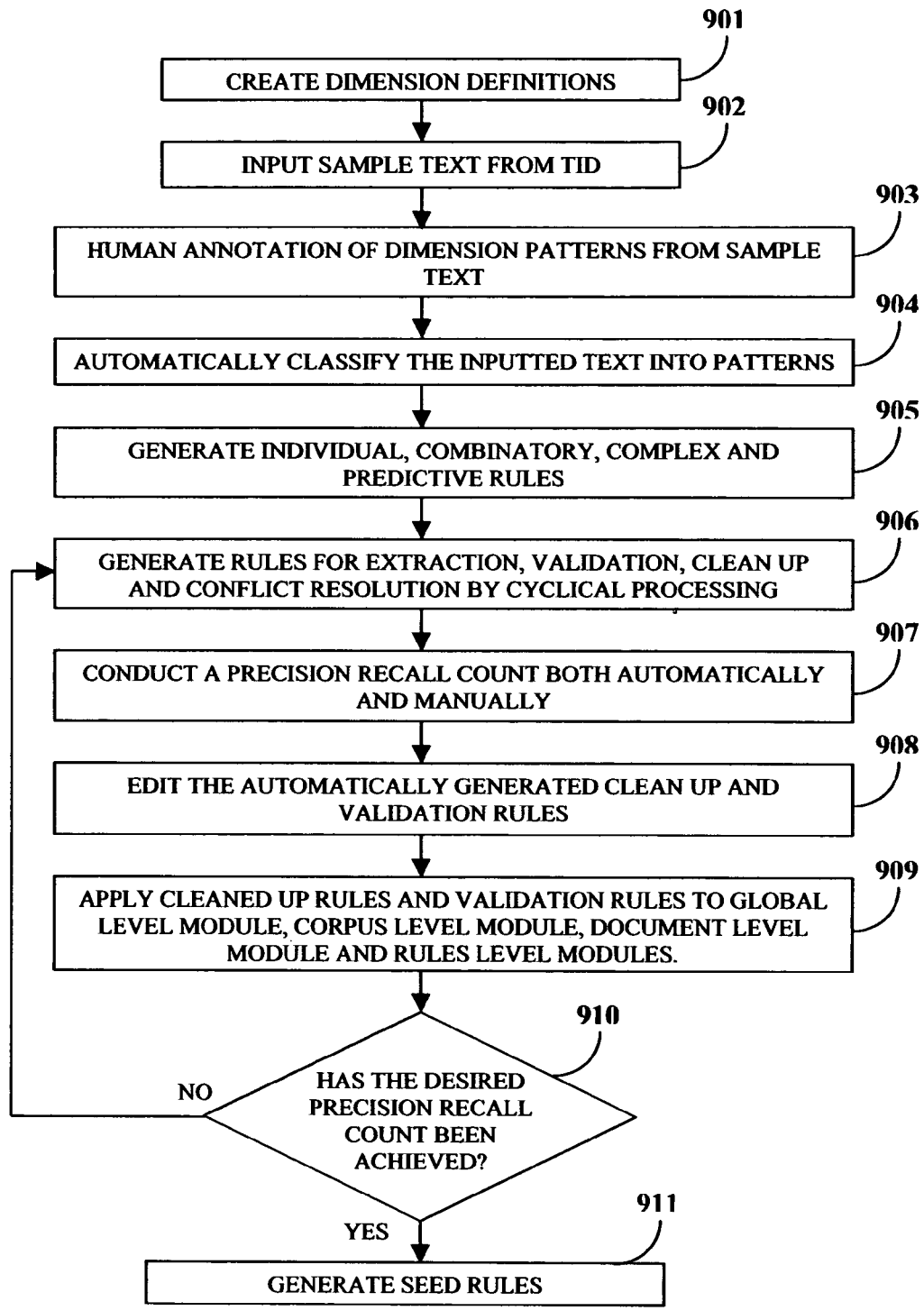
FIG. 9A illustrates the processes implemented by the dimension extraction engine.

FIG. 8 illustrates the components of the dimension extraction engine. FIG. 9A illustrates the processes implemented by the components of the dimension extraction engine, i.e. the rule generation module 801, clean up and conflict resolution module 802, precision recall and measurement module 803 and results edit module 804.

Examples of dimensions include the name of a person, organization, location, time, event, brand, scientific and general measurements, etc. . . . The definitions for dimensions are created 901 using human input and the sample text from the textual information database (TID) is selected 902. The human annotation of dimension patterns is derived from the syntactic, lexical and dimension specific heuristics of the sample text 903. The chosen sample text is automatically classified by applying definitions created using these pre-set heuristics that converts the sample text input into various patterns 904. For example, words and or diacritical markers in immediate proximity to the dimension is known as syntactic marker and one that is at a certain distance is known as lexical marker. For example, consider the sentence—"Prior to joining NICTA, Zhang accumulated more than ten years of research and industrial experience in multimedia information technology at Motorola's Australian research centre, Motorola Labs, where he worked as principal staff research engineer." In this sentence, the pattern for syntactic and lexical markers for the dimension "Motorola" are: "comma" after the phrase "Motorola Labs" is the syntactic cataphoric marker, "Labs" is the syntactic anaphoric marker, "research centre" is the lexical cataphoric marker and "comma" before the phrase "Motorola Labs" is the lexical anaphoric marker.

The rule generation module 801 comprises an individual dimension rule generator, combinatory rule generator, complex rules generator and predictive rule generator 905. The individual dimension rules generator automatically generates dimension extraction rules using specific patterns. For example, the letters "Inc." which an example of an organizational name pattern, will be preceded by one or more generally capitalized words. The combinatory rule generator extracts new dimensions using known dimensions by framing combinatory rules. The complex rules generator requires human input until a recognizable pattern emerges. For example, a ticker symbol and organization name without an end word, such as Inc., followed by a measurement such as US$200, and such repetitions indicate that numerical may be the stock price for the organization that precedes the ticker symbol. The predictive rule generator uses syntactic and lexical pattern analysis to create a predictive model that is used to identify or predict the presence of certain dimensions. For example, consider an organization name pattern. The organization can be identified if it is preceded by a title or role indicator such as "CEO", "President", Chairman, etc., and is again preceded or followed by one or two capitalized words. For example, "Microsoft Chairman Bill Gates". The same pattern can be used to predict that the aforementioned one or two capitalized words are a person's name.

The rule generation module 801 is configurable to allow various permutations and combinations of the individual dimensions extraction rules as may be demanded by dimensions extraction heuristics.

The extraction, validation, clean up and conflict resolution module 802 generates rules 906 that performs the process of extraction, validation, clean up and conflict resolution. The process of extraction, validation, clean up and conflict resolution of rules comprises the processes of dimension extraction rule sequence and ordering, dimension results validation sequencing and ordering, dimension results clean up sequencing and ordering and conflict resolution through cyclical processing.

The dimension extraction rule sequencing and ordering process involves the application of individual and complex rules, combinatory rules and multiple dimension rules. Individual and complex rules are applied for dimension extraction. For example, first the time element in a sentence and any measurement if present is identified, for example, stock price, role or title of person, name of organization, name of person. Combinatory rules apply one dimension to extract another dimension. For example, having identified a role and an organization, the persons name can be extracted. Multiple dimensions extraction rules apply one or more dimensions for simultaneous extraction of one or more dimensions. For example, if two roles and two organization names appear sequentially in a sentence, the names of two persons connected with the above two roles can be extracted.

The dimension results validation sequencing and ordering process comprises "results validation" at the global level module, document corpus level module, document level module, and results validation rule level module. The dimension extraction rule, dimension results validation rule and dimension results clean up rules are sequenced.

Figure 9B:
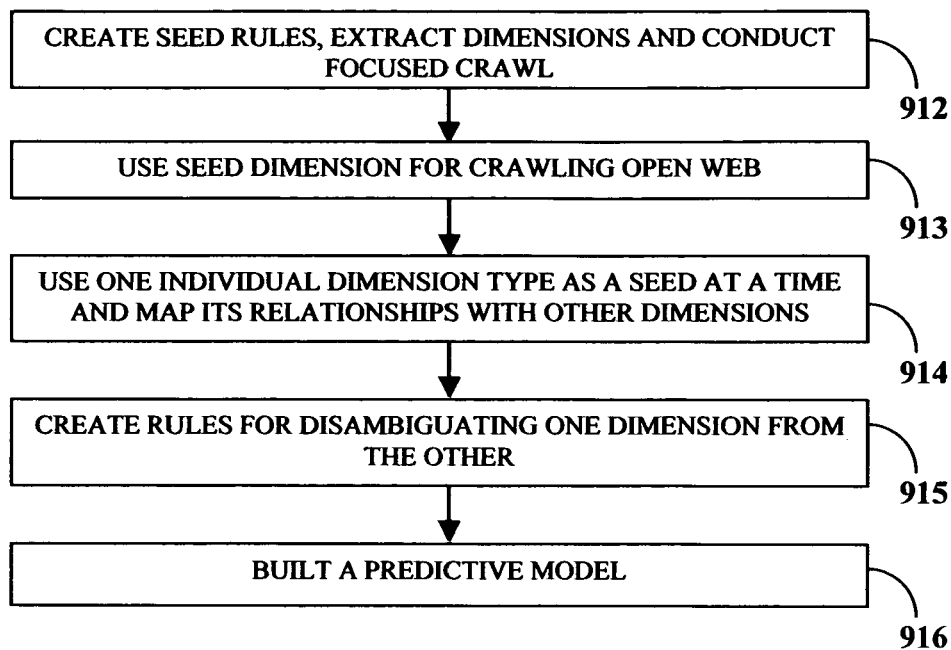
FIG. 9B illustrates the method of boot-strapping the dimension extraction.

FIG. 9B illustrates the method of bootstrapping dimension extraction. Seed information is the source that is used as an exemplar of authority or domain expertise for learning about a particular textual aspect for which an information profile is to be built. The seed information is processed for mining and mapping textual aspects relationships. Textual aspect ranking is achieved by assigning a relevance rank to the seed information. Based on this ranked information, automated queries are generated to be transmitted to other information sources, or crawl the open worldwide web and extract further information to generate profiles.

The seed rules are the output of the dimension extraction engine. The seed rules 912 and seed information are used for building predictive rules that bootstrap the dimension extraction process.

A focused crawl is applied to a subset of the information source, such as a private database, or the worldwide web. As the first step, the dimension to be extracted is defined and a representative sample of the dimension is chosen as a seed dimension to process the focused crawl 913. The seed rules are applied on extracted dimensions. For example, words such as "a firm like" are used to understand a company name such as Microsoft. Rules are validated using human intervention and new individual dimension rule patterns are generated. For example, words "a company like" and "a business house like" provide a new understanding of a company name such as Microsoft.

The seed rules are applied on the focused crawl 913. The pattern recognition model essentially recognizes the syntactic and lexical anaphoric, cataphoric and diacritical markers around the seed dimension. For example, for the dimension type "organization", a seed dimension "Microsoft" is used in a focused crawl on the worldwide web using seed rules.

The worldwide web is parsed with the seed information and all possible ways in which the seed dimension can be written is identified in all possible information structure types. For example, "Microsoft" as written in news, articles, blogs, forums, product descriptions, etc.

One individual dimension type is used as a seed at a time and its relationships with other dimensions is mapped 914 and these relationships stored. For example, use the understanding of "Microsoft" as an organization to predict that "Bill Gates" is a person based on his relation, as given by his role as a "Chairman and Chief Software Architect" and his action of launching a product at "Redmond" a location. The seed dimension is mined and mapped with respect to other dimensions 914 for its individual dimension rule patterns, combinatory dimension rule patterns, part of speech pattern, co-frequency, co-dependency and co-relatedness. Rules are created for disambiguating one dimension from the other 915. For example, one rule pattern could indicate that "Microsoft" is a person name but other patterns could indicate that it is an organization.

The process of understanding one dimension with respect to another dimension is repeated and stored in its own makers or patterns as specified above in the earlier step until all possible alternatives of writing the dimension are explored.

The disambiguation rules are processed cyclically for disambiguation of one dimension from the other. The process is repeated for all dimensions.

Based on syntactic and lexical pattern analysis, a predictive model is built 916 which is used to identify or predict the presence of certain types of dimensions based on the presence or absence of dimensions and pattern recognition.

The following example illustrates the use of the predictive model in understanding patterns and predicting entities. Consider the sentence "Prior to joining NICTA, Zhang accumulated more than ten years of research and industrial experience in multimedia information technology at Motorola's Australian research center, Motorola Labs, where he worked as principal staff research engineer."

"Australian" is a location variant that can be understood from the location database. The phrase "where he worked as" could be used to predict that "principal staff research engineer" is a role. The words "at", "Australian", location "research center", "where he worked as" "principal staff research engineer" role and Lab as an end word could be used to predict Motorola Labs, is an organization name. Motorola Labs is an organization name and could be used to predict that Motorola's is an organization name. The words "he worked as", "Prior to joining", "accumulated", "years of", "experience" and "principal staff research engineer" is a role that is used to predict that Zhang is a person's name. Given the words "Prior to joining" and the fact that ZANG is a person name could be used to predict that NICTA is an organization name.

The rules generated from the process of extraction, validation, clean up and conflict resolution is applied on a document or a document corpus. The results from the aforementioned application of rules are automatically validated by the precision recall measurement module 803.

All the results are sampled for manual validation. The sample size varies according to the dimension. The automatically generated precision and recall results are manually validated and discrepancies, if any, are used in the next level 907.

If the precision and recall rate is not satisfactory as per the results of the precision recall measurement module, the sample results are edited through human intervention 908. The specifics of the above particular human intervention is captured and stored for future use so that the same problem will be addressed automatically if it occurs again. For example, if the precision recall measurement module determines that the accuracy of person's name extraction is low, then a higher number of samples will be generated for the extracted person name.

The results edit module 804 either automatically or manually performs the processes of cleaning up, validation and creation of conflict resolution rules. The results edit module determines a sample set of results for various dimensions generated based on dimension specific sampling rules. For example, only one percent of organization names will be given for human validation, whereas, three percent of person names will be given for human validation for the same piece of text using past experience. However, during are interface test, if the tester finds additional errors, the above percentages will be changed accordingly.

Automatically generated clean up, validation and conflict resolution rules are created and applied to the global level module, document corpus level module, document level module and rule level module 909. Manually generated clean up, validation and conflict resolution rules are created and applied to the global level module, document corpus level module, document level module, and rule level module.

The initially created dimension extraction rules, individual, complex, combinatory rules created after the process of "extraction, validation, clean up and conflict resolution" are edited by the results edit module. Hence, the previous rules are modified and a new set of extraction rules is created and inputted recursively between the stages of the precision recall measurement 910 and the stage of generating rules 906. The recursive process is conducted until the desired precision recall level is reached for a particular dimension. When the desired precision level is reached, the structured, unstructured and binding textual aspects are extracted. The desired precision recall level is dependent on the information type. For example, in the case of a news report, the precision recall figure should be very high, such as 95%. Whereas, in the case of a white paper, the precision recall figure may be approximately 70%. The final output of the dimension extraction engine is the seed rule 911.

Figure 10:
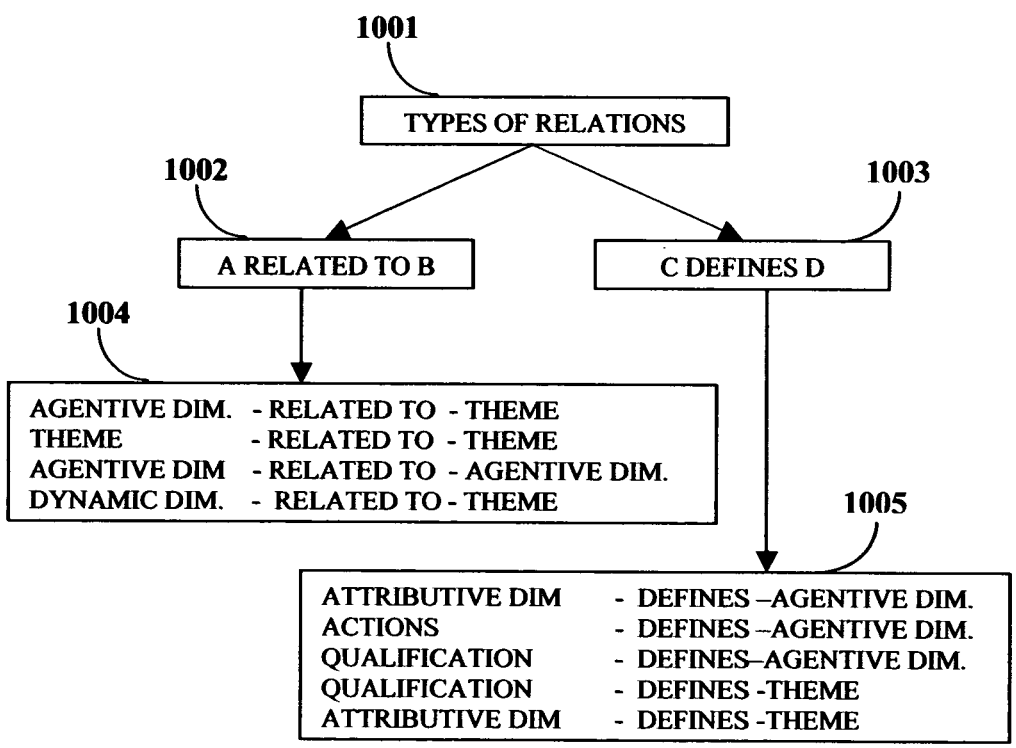
FIG. 10 illustrates the relations among the components of textual aspects.

FIG. 10 illustrates the relations among the components of textual aspects 1001. The relationship building process is executed after the extraction and processing of various textual aspects. During relationship building, the textual aspects are grouped into the following two categories of relations: associative relations 1002 and definitive relations 1003:

Associative relations are used to group the following textual aspects that form a "RELATED-TO" relation among themes, agentive dimensions and dynamic dimensions. Consider the following relation: A—RELATED_TO—B relation In this relation, B can be a textual aspect or another relation Examples of some relations that can be formed are:
Agentive dimension—RELATED_TO—theme
"Narendra Modi"—RELATED TO—"visa denial"

Figure 11:
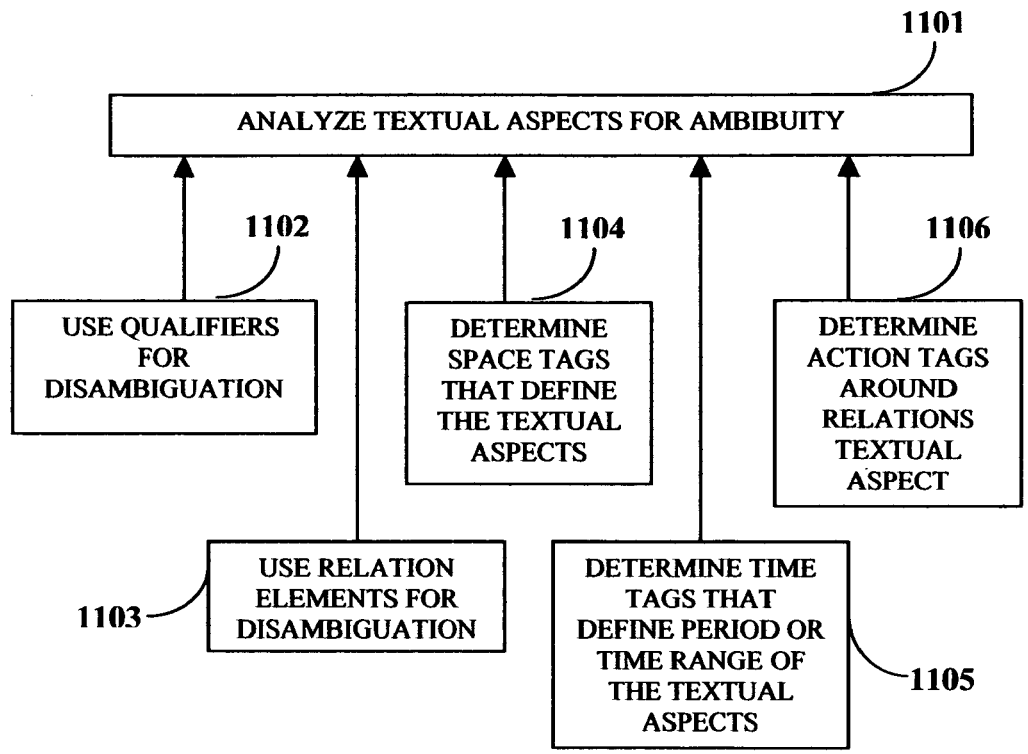
FIG. 11 illustrates the method of textual aspect disambiguation.

FIG. 11 illustrates the method of textual aspect disambiguation 1101. The textual aspects require disambiguation when the World Wide Web is used as a source of information. Disambiguation of textual aspects is accomplished using qualifiers, relation elements, time range of relations, relation space and relation actions.

Example of disambiguation are provided below:
1. Modi (agentive dimension, person: Narendra modi)
   a. Qualifiers: incorrigible, anti-muslim
   b. Elements: visa-denial, Gujrat riots
   c. Time: Feb2002-Mar2003, Mar2005-Apr2005
   d. Space: Delhi, Gujrat, Washington
   e. Actions: rejected, grounded
2. Modi (agentive dimension, organization: the Modi Group)
   a. Qualifiers: spat, false and baseless allegations
   b. Elements: civil-criminal charge, show cause notice
   c. Time: Saturday, Jun. 14, 2003, May 19, 2003.
   d. Space: New Delhi
   e. Actions: selling, franchising Each relation can be understood and disambiguated with the help of tags, qualifiers 1102 and relation elements 1103. Relations can have three types of tags: time range tags, space tags and action tags. Using time range tags 1105, a given relation can be tagged at various time instances. These tags act as hooks, defining the validity and existence of a relation, given a particular time range. A given relation has a different importance and meaning at a given location. Hence, a relation can be space tagged 1104 depending on the location. Locations, where the validity of the given relation is high are added as tags around those relations. Any given relation will have action words associated with it. These action words, which can be added as action tags 1106, help define the action around these relations.

Figure 12:
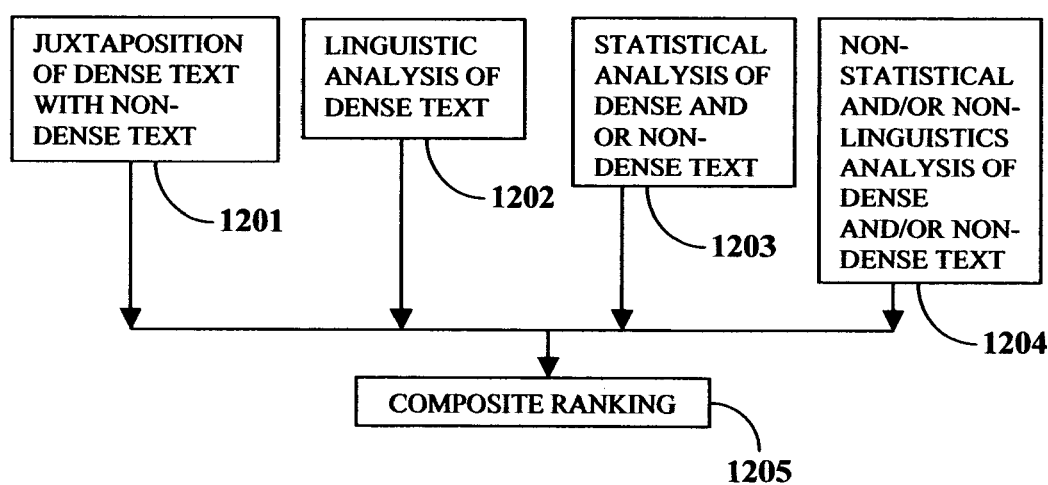
FIG. 12 illustrates the method of ranking textual aspects.

FIG. 12 illustrates the method of ranking textual aspects. The ranking of textual aspects involves the juxtaposition of dense text 1201 against non-dense text. For example in the information structure type "news", textual aspects obtained from the block of text that contains copyright information about the news source is assigned no ranking whereas textual aspects obtained from dense text part of the news item is assigned a rank.

Linguistic ranking of the dense text 1202 involves the process of arriving at a relationship weight and strength of various textual aspects through positional analysis of textual aspects that includes qualifier-qualified analysis. The ranking of textual aspects is based on their co-occurrence, co-relatedness and co-dependency within a clause, sentence, tri-sentence, paragraph, document levels.

Statistical ranking of dense and non dense text 1203 includes the determination of statistical measures such as co-frequency, co-variance distribution analysis, and the use of machine learning models, for example the use of hidden Markov models.

Non-statistical and/or non-linguistic ranking of dense and non-dense text 1204 includes the analysis of textual aspects based on analytical models borrowed from other dynamic systems such as anthropology, sociology, etc. For example, the kin-ship relationship model in anthropology is used for ranking one-way or two-way relationships between textual aspects. For example, the relationship between the structured textual aspects of time and other textual aspects is adjudged as a one-way relationship. Whereas, the relationship between structured aspects of organization and person is adjudged as a two-way relationships.

The composite rank 1205 of the textual aspects is the weighted sum of the linguistic, statistical, non-statistical and non-linguistics ranks.

Textual aspects can be ranked based on the parameters of relation count, relation strength, qualifier count and frequency. Relation count is the count of relations that the textual aspect forms with other textual aspects. Relation strength is the summation of the strength of each individual relation calculated based on its co-occurrence, co-relatedness and co-dependency at a clause, sentence, tri-sentence, paragraph and information structure type levels. Textual aspects with a higher number of qualifiers associated with them have a higher ranking. Frequency of textual aspects is determined within and across boundaries of sentence, paragraph and at information type level. Based on the rankings of textual aspects, themes, dimensions, qualification, actions, sentence or clause, tri-sentence, paragraphs or information excerpts and information structure types are ranked.

Figure 13:
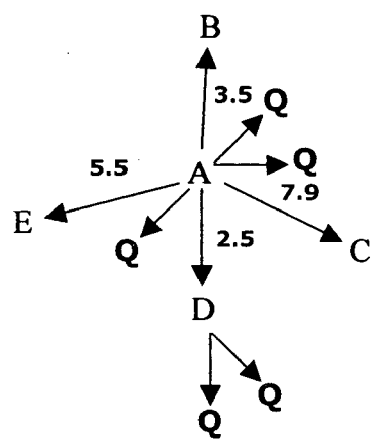
FIG. 13 illustrates an example for textual aspect ranking.

FIG. 13 illustrates an example of the composite ranking of textual aspects. Consider textual aspect A. A is related to the following four textual aspects: B, C, D and E. Hence, the relation count of A is four. The relation strength is the sum of the individual relation strength between A and B, A and C, A and D and A and E. Hence, the relation strength=(3.5+0.9+2.5+5.5)=19.4, "Q" represents qualifiers in FIG. 13. Hence, A had three qualifiers and D has two qualifiers.

Figure 14:
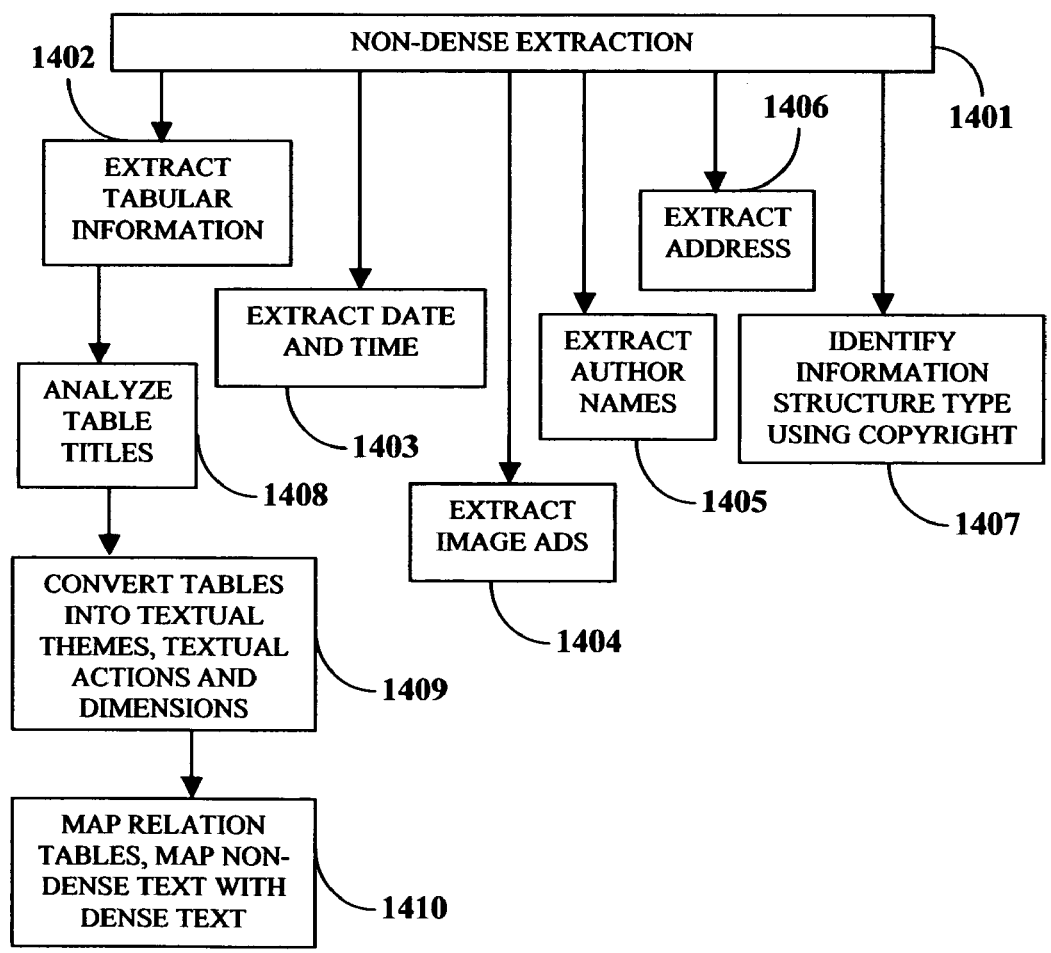
FIG. 14 illustrates the process of non-dense extraction.
Figure 15A:
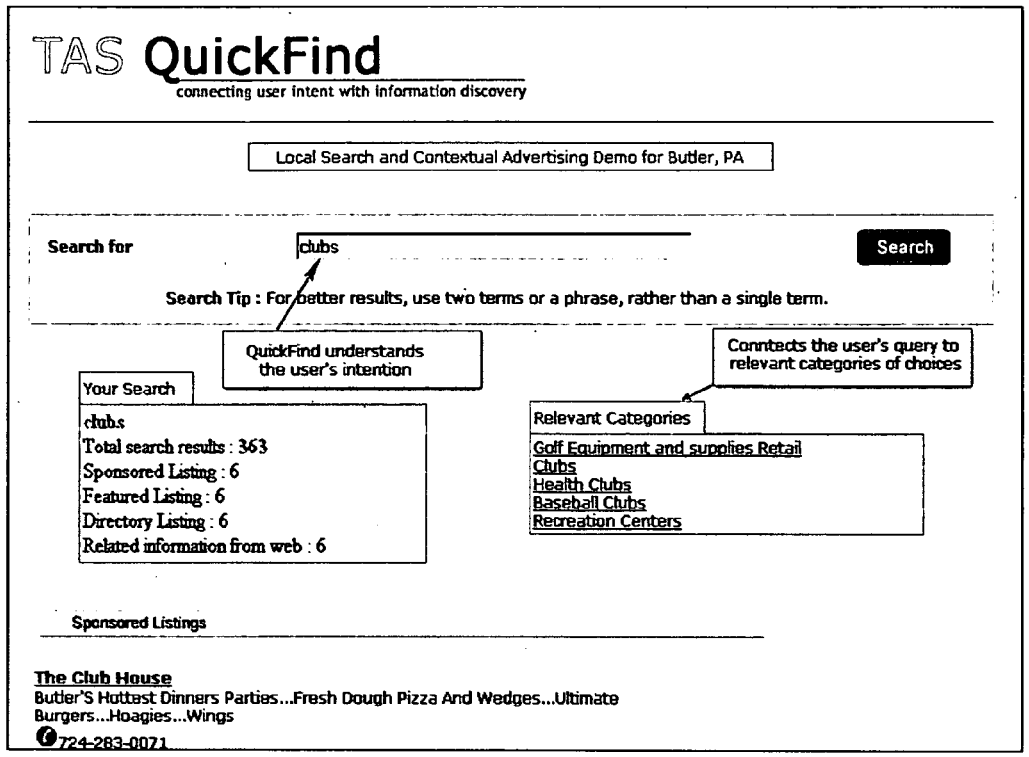
FIG. 15A, FIG. 15B, FIG. 15C and FIG. 15D illustrate an embodiment of TAP, a search tool that analyses semi-structured information and makes it more usable.
Figure 15B:
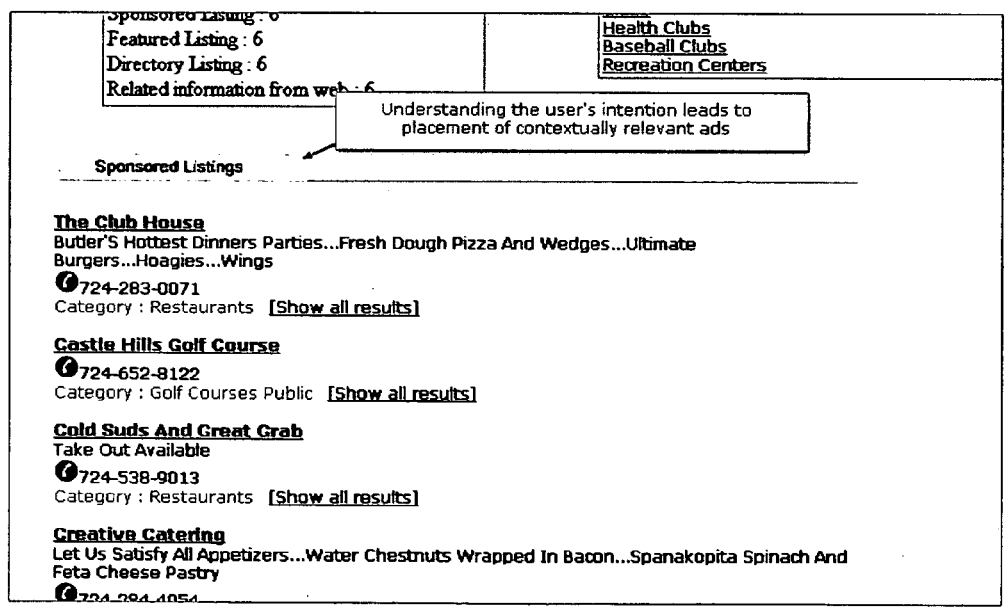
Figures 15C, 15D:
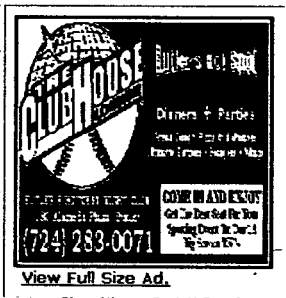

FIG. 14 illustrates the process of non-dense extraction 1401. The following are extracted from the non-dense text: information in the tables 1402, the date and time information 1403, image advertisements 1404, author names 1405, addresses from input profiles 1406, and information structure types 1407. The copyright information helps in identification of the information structure type. The tables titles are analyzed 1408 and the content of the tables are converted into textual themes, textual actions and dimensions 1409. The non-dense text is mapped with dense text 1410. For example, product specifications, a non-dense text table is mapped with product description, a dense text.

Time interpretation is based on reference to the document date, dates that are mentioned in previous or following sentence of a particular sentence. Once a particular type of time expression is interpreted, various textual aspects and textual relationships are assigned a time stamp. A time interpretation engine determines the textual and numerical representation of time embedded in textual aspects. It divides representation of time into syn absolute time, lex absolute time and inferred-referred time expressions.

Syn absolute time expressions are self contained and complete in their meaning without any further reference, interpretation or processing. Examples of syn absolute time are "day—dd/mm/yyyy—hh:mm:sec—am/pm" and all its variants whether expressed in words or numbers. Lex absolute time expressions require addition or subtraction of given time expressions or determination of the beginning and end of the compute period. Examples of Lex absolute time include the expressions "from 1998 to 2004", "during 1990s". Inferred-referred time expressions require significant processing. Example of such processing are provided below:

(i) Converting words to numbers. For example, converting "couple" to 2,
(ii) Understanding whether a reference is being made to past, present or future by identifiers such as "last", "this", "next" etc . . . .
(iii) Deriving meaning without anaphoric or cataphoric reference, such as "third quarter of 2003"
(iv) Deriving meaning with anaphoric or cataphoric reference within a clause, a sentence, tri sentence, a paragraph, document date etc. for example, deriving meaning within "since last month of last calendar year to the first quarter of next financial year" and "Last week the government was reported".
(v) Determining whether the tense changes the meaning of a time phrase, for example "Mohsen also testified that a year later",
(vi) Understanding a time phrase, for example "at the time of writing"
(vii) Understanding when an phrase is not a time phrase that can be processed meaningfully e.g. "year on year" "every day he wakes up"
(viii) Identifying an event and its associated time e.g. "Clinton Administration" and "tenth anniversary".
(ix) Determining the reference between a season, location and event. For example, "Mid Summer in America" would refer to the month of August but "Mid summer in India" would refer to the month of May.

FIG. 15A, FIG. 15B, FIG. 15C and FIG. 15D illustrate one working embodiment of TAP, a search engine that analyzes semi-structured information and makes it more usable. The search engine analyzes semi-structured information, for example, information in the printed Yellow Pages advertisements and presents the information in a usable form. The search engine processes listing categories and advertisements and relevance ranks the results by mapping closeness of various categories and advertisements. The user's queries are connected with categories listing and advertisements based on relevance. For example, when a user looks for "clogged drains", QuickFind returns "plumber" as a relevant result.

Figure 16A:
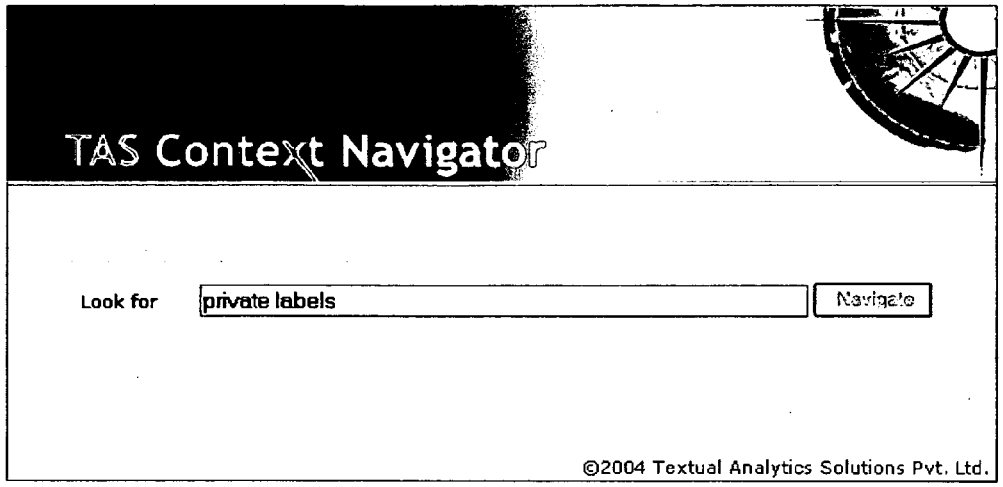
FIG. 16A, FIG. 16B and FIG. 16C illustrate another embodiment of TAP, a navigation tool that navigates through information based on themes and dimensions.
Figure 16B:
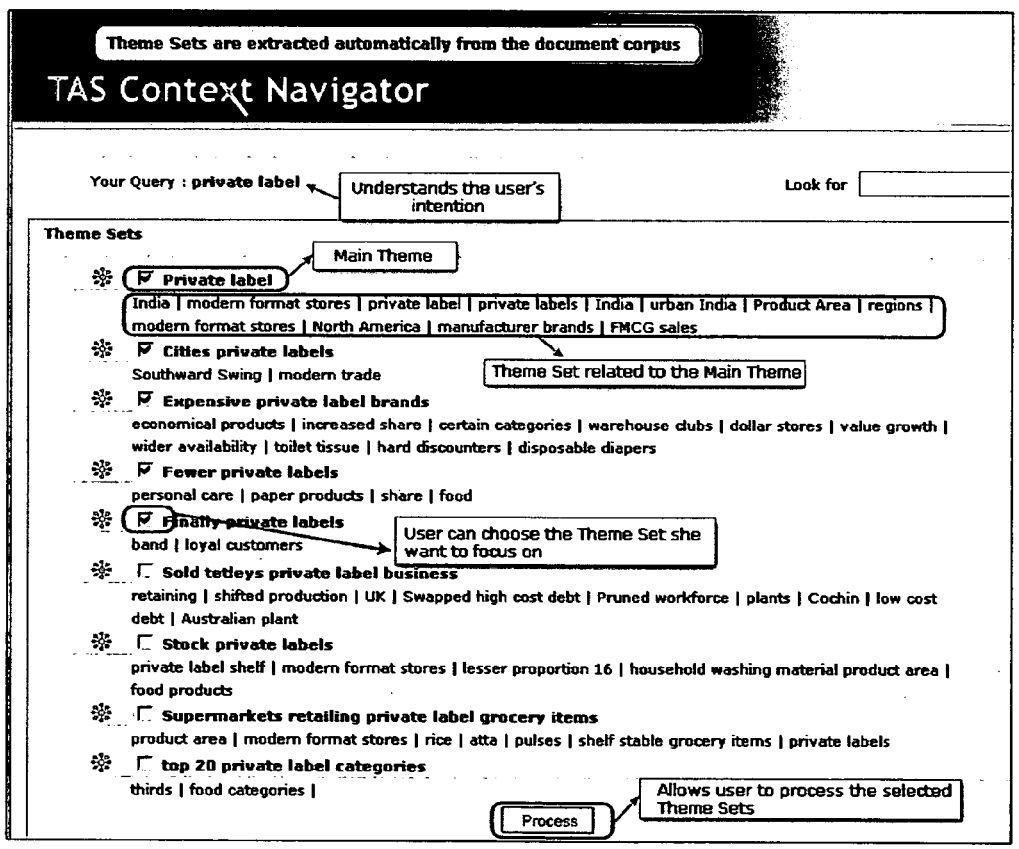
Figure 16C:
Figure 17A:
Figure 17B:
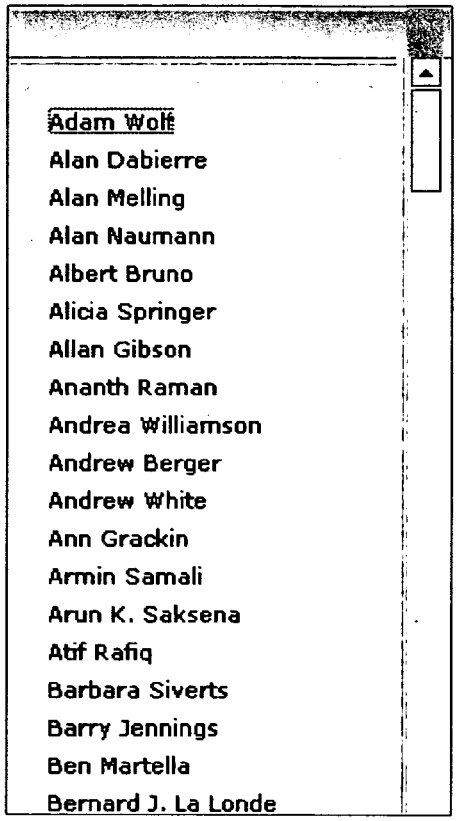
Figure 17C:
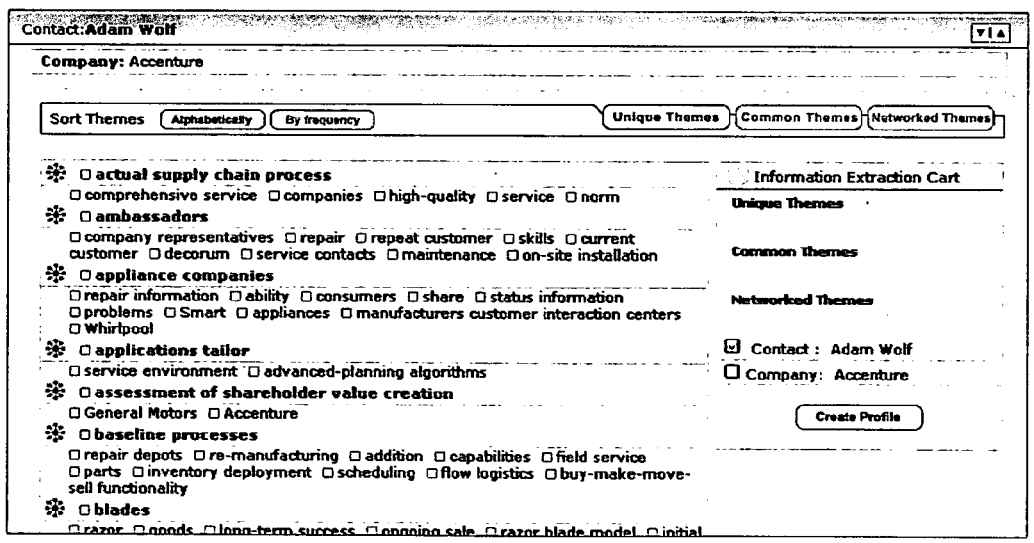

FIG. 16A, FIG. 16B and FIG. 16C illustrate another embodiment of TAP, a navigation tool that navigates through information, based on themes and dimensions. The navigation tool allows navigation through information based on themes and dimensions. The information is pre-processed, relationships are mapped and indexed. When this information is queried it returns results wherein the user can select themes of interest around the query and process the query further. The results allow the user to view and select information pieces of interest based on select dimension, for example selection based on time, people and organization.

FIG. 17A, FIG. 17B, FIG. 17C and FIG. 17D, illustrate another embodiment of TAP, a research tool for researchers to create profiles of information pieces. The research tool uses the concept of "seed information" wherein the relationship between two information pieces for example, "person & theme" is extracted from one source and used for extracting additional information from a wider and deeper source, for example the World Wide Web or private data bases. The research tool is an analytical tool that processes information structure types, extracts related information to user queries, relates, disambiguates and presents the results in a pre-determined format. The user can select items of interest from generated results and create a profile.

Figures 17D, 18A:
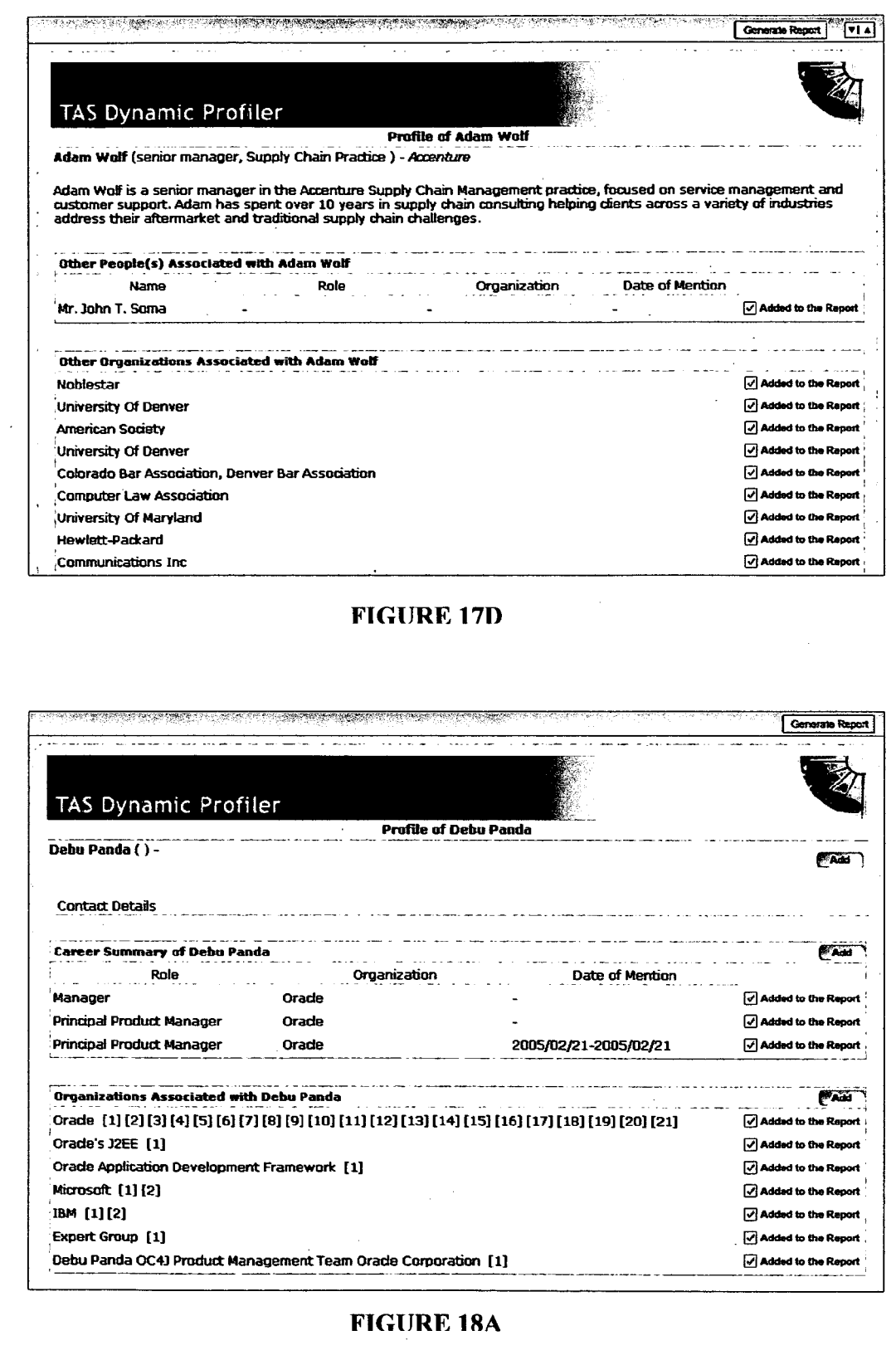
Figure 18C:
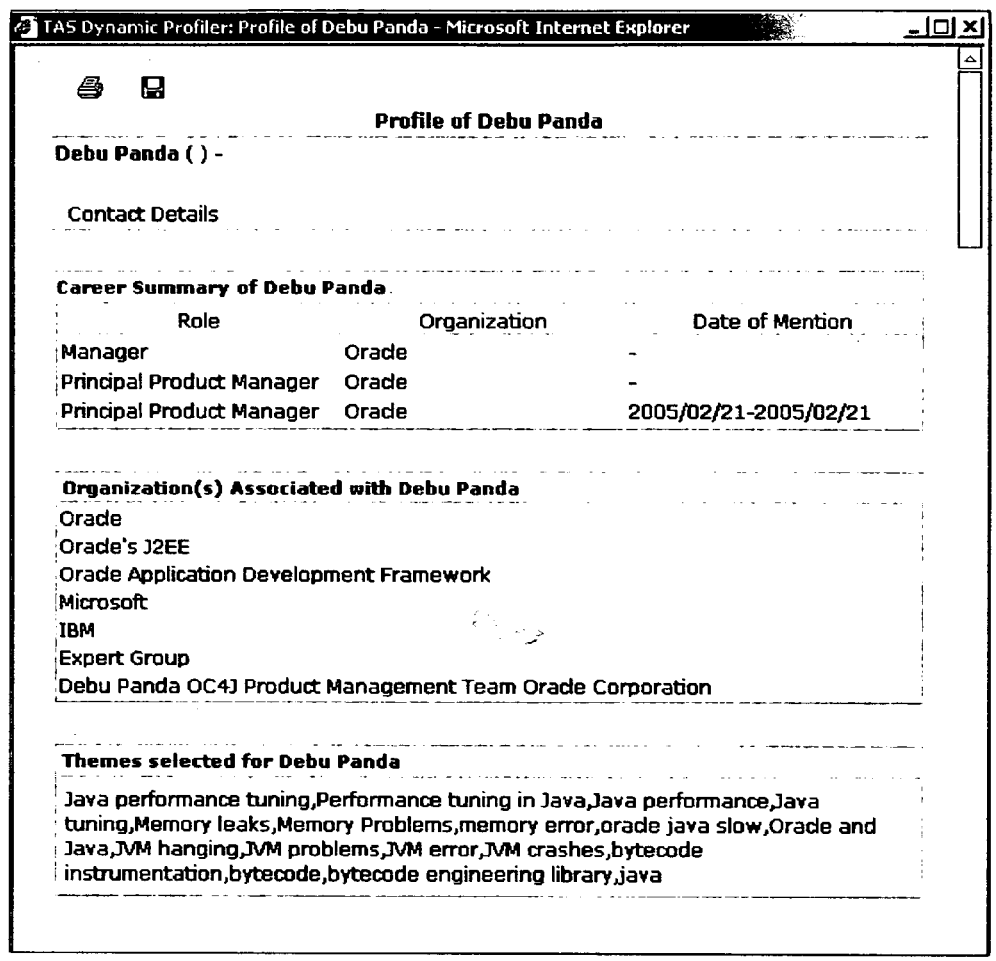
Figure 19A:
FIG. 19A, FIG. 19B, FIG. 19C, and FIG. 19D illustrate another embodiment of TAP, a profiling tool used by consumers for profiling a product.
Figure 19B:
Figure 19C:
Figure 19D:

FIG. 18A, FIG. 18B and FIG. 18C illustrate another embodiment of TAP, a profiling tool for consumers that is used for profiling a person. The profiling tool analyzes various information structure types, extracts related information, disambiguates and presents the extracted information in a pre-determined format. It uses various sources of person information, such as news, articles, white papers, blogs and creates a person profile in a predetermined format. It saves time and effort for the user and provides a dynamically generated person profile. A similar tool can be used by consumers to determine the profile of products.

FIG. 19A, FIG. 19B, FIG. 19C, and FIG. 19D illustrate another embodiment of TAP, a profiling tool for consumers that is used for profiling a product. The product profiling tool analyzes various information structure types, extract related information, disambiguate and present the same in a pre-determined format. The profiling tool gathers product information from information sources such as product specifications, product description, professional reviews, consumer reviews, news, articles, blogs etc. and creates product profile in a pre determined format. This allows the customer to view the relevant product information, including unique features, issues and concerns etc . . . . and saves time and money in the product research process.

The system and method of this invention enables users to navigate across a multidimensional matrix. The dimensions of the matrix include time, number, location, event, people roles, organizations, brand names and products, scientific and technology names and terminologies, quotations and attribution, explanations, arguments, opinions, suggestions, findings, assumptions, relations, associations, negations, emotions, sentiments, oppositions, contradictions, contrasts, qualities, attributes, commands, directives, order, rulings, measurements including scientific, technical and commercial and general measures, names of natural and manmade living beings like plants, animals, genes, clones, names of natural and manmade things, substances like chemicals, drugs, monuments, names of arts, culture, sports, and other terms and terminologies, causes, membership, substance, fact, non facts, type and kind, entailment, part whole, contrast, metaphor, metonymy, similarity, and compare.

The multi-dimensional matrix is ranked to facilitate a user to select the most effective dimension set to navigate with.

DEFINITIONS

Agentive dimensions: The agentive structural aspects or agentive dimensions are causative in nature; people and organizations fall in this category. The agentive structural aspects can be involved in an action and can have qualifiers around them. For example, Mahatma Gandhi is a person name associated with peace and non-violence.

Agentive textual qualifiers: Agentive textual qualifiers qualify an agentive textual aspect, for example, incorrigible Narendra Modi.

Associative relations: Associative relations are used to group textual aspects that form a "RELATED-TO" relation among themes, agentive dimensions and dynamic dimensions.

Attributive structural aspects: Attributive structural aspects define attributes of another textual aspect. These attributes can be used in a particular context either in conjunction with or when placed adjacent to another term, when they become causative or definitive in nature. For example, "General" when used to represent a role as a commissioned rank in the military organization and term "6.3" when used in case of camera as in "6.3 Mega Pixel". Other examples are location and time, which act as textual hooks for a textual aspect or a textual relation.

Attributive textual qualifiers: Attributive textual qualifiers qualify an attributive textual aspect, for example, the cunning Captain Hook.

Binding textual aspects: The binding textual aspects bind together either the textual aspects with each other or with textual relations. The binding textual aspects also, by the way of binding, define the textual aspects and textual relations better, add more meaning and play a major role in the process of disambiguation. The binding textual aspects are subdivided into textual actions and textual qualification.

Co-dependency: The measure of co-dependency includes three different sub-streams of processing and extraction, including intra-dimensional dependency, inter-dimensional dependency and contextual dependency.

Contextual dependency: Contextual dependency is established between two dimensions or between the dominant form and dependent form of a single dimension, determined by their contextual, grammatical and positional relationships.

Co-frequency: The co-frequency of textual segments is a measure of textual segments that are frequent within a document and frequent across documents, textual segments that are frequent within a document but not frequent across documents, textual segments that are not frequent within a document but are frequent across documents and textual segments that are not frequent within a document and are not frequent across documents.

Co-relatedness: Co-relatedness is a measure of relationships to be established between various textual units. Relatedness is measured through word-stemming and lemmatization, for example, the relationship between company and companies; through qualifier and qualifieds, for example, the relationship between mobile phone and cell phone; and through semantic analysis, for example, the relationship between mobile and cell.

Dense text: Dense text is a rich source of information. For example, in an e-mail, the body of the e-mail containing clauses, sentences and paragraphs is the dense text.

Dimensions: Textual dimensions are a subset of structured textual aspects. Examples of dimensions include the name of a person, organization, location, time, event, brand, scientific and general measurements, etc . . . .

Dynamic structural aspects: Dynamic structural aspects define physical objects and have an implicit relation with the object. These textual aspects are not predefined but are defined dynamically based on the ranking of their relations with the object. For example, zoom and flash are dynamic structural aspects for the object camera.

Dynamic textual qualifiers: Dynamic textual qualifiers qualify a dynamic textual aspect, for example, a good optical zoom.

Information structure type: The manner in which information is created bears a unique stamp that distinguishes one information type from another. Examples of information types include news, blogs, product reviews, product description pages, resumes, etc. For example, a news article is far more structured than a blog; and, an expert product review is more similar to a product specification than a consumer review. Also, for example, in a news article, the first paragraph is typically a summary of the entire body of the news article. Also, blogs typically do not have a summary in the beginning due to the informal nature of the creation of blogs.

Inter-dimensional dependency: Inter-dimensional dependency is the dependency between two or more textual dimensions. For example, there could a dependency between a dominant form and a dependent form, dominant form and dominant form, dependent form and dependant form, etc.

Intra-dimensional dependency: A particular dimension could have a dominant form or a dependent form. For example, George Bush is a dominant form and George W is a dependent form. Based on the occurrence of a dimension within and across a document, a dimension could go through three different forms of procedural occurrence change, including split, mutation and extension. In a split, a dimension could split into a shorter form, for example George Bush is converted to Mr. Bush. In a mutation, a dimension could fuse into other dimension. For example, George Bush is a persons name and President Bush is a combination of a person and his role. In an extension, a dimension could extend based on its procedural occurrence. For example, George Bush extends to George W Bush.

Non-dense text: Non dense text is information available in a predetermined format, such as the "To", "From" and "Date" section of an e-mail.

Part of speech tagger: The part of speech tagger is a subset of a basic shallow text parser. Multiple tag sets are available for use. An example of one such tagset is the tagset of The University of Pennsylvania Treebank. This part of speech tagging process enables dynamic processing of information based on the information structure type and the context of the textual information.

Phrase chunks: Structured, unstructured, and binding textual aspects are derived through two different levels of parsing. The first level of parsing obtains phrase chunks through a coarse parts of speech tagging process and through the process of information structuration. In the second level of parsing, these phrase chunks are refined through cyclical processing to yield structured, unstructured and binding textual aspects.

Qualifier-qualifieds: Textual qualification involves a process of determining a word or a series of words referred to as qualifiers that can qualify a word or a series or words referred to as qualifieds.

Structured textual aspects: Structured textual aspects are aspects of text that communicate the meaning without ambiguity. Examples include the names of people or organizations.

Textual actions: Textual actions are a subset of unstructured textual aspects. Textual actions provide context to the assumed or intended actions. For example, in the context of the retail industry, the text "merged", "sold" and "purchased" are textual actions associated with store brands or with Wal-Mart.

Textual qualification aspects: Textual qualification aspects or qualifiers, qualify both structured and unstructured textual aspects. The process of textual qualification of an unstructured textual aspect is exemplified as follows. For a theme "Private Labels", "private" is the qualifier and "labels" is the qualified.

Themes: Themes are unstructured textual aspects. Refer to the definition of unstructured textual aspects. Themes are unstructured aspects of text requiring more interpretation, meaning and reader understanding of the domain under consideration.

Unstructured textual aspects: Unstructured textual aspects are aspects of text that are context dependent and interpretation based. For example, while discussing the retail industry, an author discusses "store brands" and "private labels". The "store brands" and "private labels" aspects are more dependent on the context or perspective of the reader or the author. The author may not be able to effectively communicate to the reader his or her perspective of "store brands" or "private labels". However if author states that Wal-Mart sells private labels and gives some names of such labels, the author will be able to communicate the idea effectively to the reader.

We claim:

1. A method of creating a text analytics and decision support matrix by analyzing and deriving analytical insights from a given textual information database using a textual information processor, said textual information processor performing the steps of:

conducting information structuration for deriving information structure types, wherein said information structure types enable classification of said information structure into dense text and non-dense text;

deriving phrase chunks through shallow text parsing, wherein the step of shallow text parsing further comprises parts of speech tagging of said dense text and the application of said information structure types;

conducting cyclical processing for deriving a plurality of textual aspects from said derived phrase chunks, comprising:

deriving structured textual aspects, wherein said derived structured textual aspects communicate meaning unambiguously and are context independent;

deriving unstructured textual aspects, wherein said derived unstructured structural aspects are one or both of context dependent and domain dependent; and deriving binding textual aspects, wherein said binding textual aspects bind together either the textual aspects with each other or the textual aspects with textual relations;

constructing relationship maps connecting said structured, unstructured and binding textual aspects;

determining a plurality of tags for defining relationship between said structured, unstructured, and binding textual aspects, wherein said determined tags comprise one or more space tags, one or more time tags, and one or more action tags;

disambiguating relationship between said structured, unstructured, and binding textual aspects using one or more qualifiers, one or more relation elements, and one or more of said determined tags;

ranking textual aspects using said relationship maps; and creating said text analytics and decision support matrix using the relevancy ranked textual aspects.

2. The method of claim 1, wherein the information structure types are
further divided into dense text types, non-dense text types, uniform resource locator URL patterns, title patterns, text structure patterns and presentation patterns.

3. The method of claim 1, wherein the step of cyclical processing further
comprises tagging parts of speech, extracting textual dimensions, determining co-frequency of textual segments, determining co-dependency of textual segments, and determining co-relatedness of textual segments.

4. The method of claim 1, wherein the step of deriving the structured, unstructured and binding textual aspects from the phrase chunks, further comprises the steps of:
generating individual, combinatory, complex, and predictive dimension extraction rules;
sequencing and ordering of said dimension extraction rules;
applying the dimension extraction rules for extracting dimensions;
measuring the precision value of the dimensions extracted;
editing the rules and reapplying them to generate a new set of dimensions if the precision or recall value is below a required prescribed value; and
processing the textual aspects by a set of processing elements cyclically until a minimum output resolution is achieved.

5. The method of claim 1, wherein the step of ranking textual aspects comprises:
determining the agentive dimension, and attributive dimension from the structural textual aspects;
determining the themes, dynamic dimension, actions, qualifiers and binding textual aspects from unstructured textual aspects; and
building relationship maps for said agentive dimension, dynamic dimension, attributive dimension, themes, actions and qualifiers.

6. The method of claim 1, wherein the step of extracting dimensions in the step of cyclical processing further comprises:
bootstrapping the dimension extraction using predictive rules built using a plurality of seed rules and seed information obtained as an output of dimension extraction comprising the steps of:
defining a dimension to be extracted and choosing a representative sample of said dimension as a seed dimension for processing a focused crawl;
applying a plurality of seed rules on previously extracted dimensions;
mapping relationship of said dimension with other dimensions using one individual dimension type as a seed at a time, wherein said mapped relationship is stored;
mining and mapping the seed dimension with respect to other dimensions for obtaining the individual dimension rule patterns, combinatory dimension rule patterns, part of speech pattern, co-frequency, co-dependency and co-relatedness;
creating rules for disambiguating one dimension from the rest and repeating the process of disambiguating one dimension with respect to another dimension and storing in a unique set of patterns until all possible alternatives of writing the dimension are explored;
processing a plurality of disambiguation rules cyclically for disambiguating the dimension from the rest and repeating the process for all dimensions; and
building a predictive model based on syntactic and lexical pattern analysis for identifying the presence of certain types of dimensions based on the presence or absence of dimensions and pattern recognition.

7. The method of claim 1, wherein the step of determine the relationship maps between textual themes, textual actions and textual dimensions comprises determining the co-frequency, co-occurrence, co-dependency, co-relatedness measures of said textual themes, textual actions and textual dimensions either within a document or across documents in a textual database of a document corpus.

8. The method of claim 1, wherein the step of creating seed dimensions comprises:
templatizing and automatically capturing human annotation;
generating humanly created rules; and
combining said humanly created rules and semi-automated computer generated predictive rules for extracting and processing textual dimensions from a document or a document corpus.

9. The method of claim 1, wherein textual dimensions are time, number, location, event, people roles, organizations, brand names and products, scientific and technology names and terminologies, quotations and attribution, explanations, arguments, opinions, suggestions, findings, assumptions, relations, associations, negations, emotions, sentiments, oppositions, contradictions, contrasts, qualities, attributes, commands, directives, order, rulings, measurements including scientific, technical and commercial and general measures, names of natural and man-made living beings like plants, animals, genes, clones, names of natural and man-made things, substances like chemicals, drugs, monuments, names of arts, culture, sports, and other terms and terminologies, causes, membership, substance, fact, non-facts, type and kind, entailment, part whole, contrast, metaphor, metonymy, similarity and compare.

10. The method of claim 1, wherein the step of conducting cyclical processing comprises determination of the measure of co-relatedness, comprising the steps of:
detecting word form for allowing alternative forms of a word to be included to determine relatedness of themes;
detecting qualification positioning, wherein one or two words qualify one or more words for determining the closeness of textual themes; and
detecting the variation in sense form, wherein two different dictionary senses of words determine the closeness of textual themes.

11. The method of claim 7, wherein the step of measuring co-dependency comprises:
measuring intra-dimensional dependency, wherein a particular dimension may have a dominant form or a dependent form, further comprising one of more of the following steps of:
splitting a dimension into a shorter form;
mutating a dimension by fusing it with another dimension;
extending a dimension based on its procedural occurrence;
measuring inter-dimensional dependency, wherein dependency between two or more textual dimensions is determined and extracted; and
measuring contextual dependency, wherein dependency between two dimensions within a single dimension is determined by their contextual, grammatical and positional relationships.

12. The method of claim 7, wherein the measure of co-frequency comprises the steps of:

measuring the co-frequency of textual segments that are frequent within a document and frequent across documents;

measuring the co-frequency of textual segments that are frequent within a document but not frequent across documents;

measuring the co-frequency of textual segments that are not frequent within a document but are frequent across documents; and measuring the co-frequency of textual segments that are not frequent within a document and are not frequent across documents.

13. The method of claim 1, wherein the step of determining the most relevant textual aspects by ranking, comprises:

determining the count of relations that each textual aspect forms with every other textual aspect;

determining the summation of the strength of each individual relation, wherein the strength is based on a measure of co-occurrence, co-relatedness and co-dependency at a clause, sentence, tri-sentence, paragraph and document and document corpus level;

counting the number of qualifiers associated with each textual aspect; and measuring the frequency of textual aspects within and across boundaries of sentence, tri-sentence, paragraph, document and document corpus level.

14. The method of claim 1, wherein the step of ranking the textual aspects further includes the steps of ranking themes, dimensions, qualifiers, actions, sentences, clauses, tri-sentences, paragraphs, document and document corpus level.

15. A system, comprising of a processor and a storage device, configured for creating a text analysis and decision support matrix by analyzing and deriving analytical insights, and further comprising:

a visual information extraction and structuration engine for conducting information structuration for deriving information structure types;

cyclical extractor for conducting cyclical processing and deriving phrase chunks from said information structures and deriving structured, unstructured and binding textual aspects from the phrase chunks;

relationship builder for identifying the relation between said structured, unstructured and binding textual aspects and constructing relationship maps;

ranking module for ranking textual aspects using said relationship maps;

text analytics and decision support matrix creator for creating text analytics and decision support matrix using the relevancy ranked textual aspects;

a model enhancer for generating automated web queries and conducting wide web crawl for enhancing the product;

a textual information database for storing data; and a user interface for presenting the text analysis and decision support matrix in usable form.

16. The system of claim 15, wherein said text analytics and decision support matrix comprises matrix variables customizable to cater to specific needs of a user.

17. The system of claim 15, wherein said cyclical extractor further comprises:

a dimension extraction engine for extracting dimensions from the textual aspects comprising:

a rule generation module for generating dimension extraction rules;

a validation clean up and conflict resolution module for dimension extraction rule sequence and ordering, dimension results validation sequencing and ordering, dimension results clean up sequencing and ordering and conflict resolution through cyclical processing;

a precision recall and measurement module for modifying a plurality of rules for dimension extraction and creating a new set of rules; and a result editing module for determining a sample set of results for various dimensions generated based on dimension specific sampling rules.

18. The method of claim 1, wherein said space tags define relationship between the textual aspects based on location of the textual aspects and said time tags define relationship between textual aspects based on a given time range, wherein said time tags further validate and find existence of the relationship between the textual aspects for said given time range.

19. The method of claim 1, wherein said action tags define relationship based on action associated with the textual aspects.

\* \* \* \* \*